(12) United States Patent
Kumar et al.

(10) Patent No.: US 9,141,383 B2
(45) Date of Patent: Sep. 22, 2015

(54) SUBPROCESS DEFINITION AND VISUALIZATION IN BPEL

(71) Applicant: Oracle International Corporation, Redwood Shores, CA (US)

(72) Inventors: Yogesh Kumar, Sunnyvale, CA (US); Glenn Weiqun Mi, Saratoga, CA (US); Muruganantham Chinnananchi, Mountain View, CA (US); Michal Chmielewski, San Jose, CA (US); Murali Pottlapelli, Chino, CA (US); Ronald Ten-Hove, Concord, MA (US); Simone Geib, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 88 days.

(21) Appl. No.: 13/963,708

(22) Filed: Aug. 9, 2013

(65) Prior Publication Data
US 2015/0046905 A1    Feb. 12, 2015

(51) Int. Cl.
*G06F 9/44*    (2006.01)

(52) U.S. Cl.
CPC ........................................ *G06F 8/71* (2013.01)

(58) Field of Classification Search
CPC .......................................................... G06F 8/71
See application file for complete search history.

(56) References Cited

U.S. PATENT DOCUMENTS

| | | | | |
|---|---|---|---|---|
| 5,507,030 A * | 4/1996 | Sites | ............................. | 717/136 |
| 5,596,752 A * | 1/1997 | Knudsen et al. | ............... | 717/117 |
| 5,649,203 A * | 7/1997 | Sites | ............................. | 717/156 |
| 5,652,889 A * | 7/1997 | Sites | ............................. | 717/144 |
| 6,601,234 B1 * | 7/2003 | Bowman-Amuah | .......... | 717/108 |
| 7,827,527 B1 * | 11/2010 | Chiluvuri | ....................... | 717/109 |
| 7,890,928 B2 * | 2/2011 | Patrudu | .......................... | 717/114 |
| 8,924,269 B2 * | 12/2014 | Seubert et al. | .................. | 705/35 |
| 2002/0120921 A1 * | 8/2002 | Coburn et al. | ................ | 717/140 |
| 2002/0147763 A1 * | 10/2002 | Lee et al. | ........................ | 709/202 |
| 2003/0041110 A1 * | 2/2003 | Wenocur et al. | ............... | 709/206 |
| 2005/0166193 A1 * | 7/2005 | Smith et al. | .................... | 717/143 |
| 2005/0171746 A1 * | 8/2005 | Thalhammer-Reyero | ........ | 703/2 |
| 2008/0082959 A1 * | 4/2008 | Fowler | ........................... | 717/104 |

(Continued)

OTHER PUBLICATIONS

Narendra, Nanjangud C., et al; "Effective Reuse via Modeling, Managing, and Searching of Business Process Assets" IEEE Computer Society 2012; 8 pages.

(Continued)

*Primary Examiner* — Chameli Das
(74) *Attorney, Agent, or Firm* — Trellis IP Law Group, PC

(57) ABSTRACT

A system and method for enabling reuse of a portion of a business process. An example method includes employing a business process language to facilitate accessing a definition of a subprocess characterizing the process logic, wherein the definition indicates one or more parameters to be used by the subprocess to implement a task specified by the process logic; and employing the definition to facilitate: using one or more variables of a parent process as one or more arguments that are passed to an instantiated version of the subprocess, and mapping the one or more arguments to the one or more parameters. In a more specific embodiment, the example method further includes characterizing a behavior of the subprocess via one or more dynamic scoping rules. The business process language includes a version of Business Process Execution Language (BPEL), and a BPEL extension activity facilitates defining the subprocess.

20 Claims, 11 Drawing Sheets

(56) References Cited

U.S. PATENT DOCUMENTS

2008/0262815 A1* 10/2008 Tian et al. .................. 703/13
2010/0198799 A1* 8/2010 Krishnan et al. ............ 707/702
2011/0035728 A1* 2/2011 Janczewski ................. 717/116
2012/0185834 A1* 7/2012 Ohrstrom .................... 717/148
2014/0282366 A1* 9/2014 Barletta et al. .............. 717/105

OTHER PUBLICATIONS

Kloppmann, Matthias, et al; "WS-BPEL Extension for Sub-processes—BPEL-SPE" a joint White Paper by IBM and SAP; Sep. 2005; 17 pages.

Chappell, David; "Introducing SCA" copyright 2007 Chappell & Associates; Jul. 2007; 22 pages.

Using BPEL to Build Composite Services and Business Processes; downloaded circa Jun. 4, 2013; 32 pages.

Semantics Utilized for Process Management Within and Between Enterprises; Information Society Technologies; Apr. 2008; 27 pages.

Web Services Business Process Execution Language Version 2.0; Oasis Standard, Apr. 11, 2007; 264 pages.

Pierra, G., et al; Exchange of Component Data: the PLIB (ISO 13584) Model, Standard and Tools; Proceedings of the CALS Europe '98 Conference; Sep. 1998; 17 pages.

* cited by examiner

SUBPROCESS DEFINITION AND VISUALIZATION IN BPEL

CROSS REFERENCES TO RELATED APPLICATIONS

This application is related to the following application, U.S. patent applications Ser. No. 13/963,738, entitled EXECUTION SEMANTICS FOR SUBPROCESSES IN BPEL, filed on Aug. 9, 2013, and Ser. No. 13/963,757, entitled USING SUBPROCESSES ACROSS BUSINESS PROCESSES IN DIFFERENT COMPOSITES, filed on Aug. 9, 2013, which are hereby incorporated by reference, as if set forth in full in this specification.

BACKGROUND

The present application relates to software and more specifically to software-based systems and methods and ontologies for facilitating development and implementation of software processes and subprocesses deployed in networked computing environments.

Software processes deployed in networked computing environments are often implemented via one or more services, such as web services. Mechanisms for facilitating development, implementation, and deployment of such processes are employed in various demanding applications, including Enterprise Resource Planning (ERP), scientific distributed computing applications, and so on. Such applications often demand use of Service Oriented Architectures (SOAs) and accompanying mechanisms and programming language features for efficiently modularizing and reusing process logic to facilitate software development, customization, deployment, and execution in various networked computing environments.

Software modularization and reuse features are particularly important in enterprise computing environments, which are often characterized by complex long-running network-distributed business processes. Web Services Business Process Execution Language (WS-BPEL 2.0, OASIS Standard), generically referred to as standard BPEL, facilitates implementing SOAs and accompanying software that employ web services to implement tasks or activities in a business process. The business process may be part of a larger software application specified via a process template and configuration plan file.

Such business processes may have many repeated portions of code, which may clutter the code, making it difficult to develop, read, understand, maintain, and accurately and consistently modify, update, and deploy. Mechanisms for enabling modularization and reuse of business process logic may aim to address such issues.

However, standard BPEL generally lacks explicit mechanisms for specifying tightly coupled reusable portions of computer code (i.e., reusable process logic fragments or snippets) in a business process, and instead relies upon a loosely coupled web service invocation model, whereby modularized tasks of a parent process are implemented by invoking web services, and whereby the web services are interfaced with the business process via WSDL (Web Services Description Language) interfaces.

Use of web services to modularize and reuse arbitrary portions of computer code can be particularly problematic for low-level repetitive software tasks, which may correspond to process logic fragments or snippets. Refactoring a business process to call web services, such as by replacing low-level process logic fragments with web service invocations, can be inefficient, potentially reducing software performance, increasing network resource consumption, and introducing latency and process life cycle management issues.

Standard BPEL defines a complex life cycle for each individual task within a BPEL-defined process. However, BPEL's web service invocation module generally lacks effective lifecycle management mechanisms for handling process fragments invoked as web services. Accordingly, handling faults, undoing tasks (e.g., compensation activities), canceling tasks, and so on, can be problematic, from both the perspective of a business process and the web service invoked by the business process. For example, in a standard BPEL parent process that invokes a web service, a termination of the parent process may not be communicated to the invoked web service, and termination of the invoked web service may not be communicated to the parent process. In summary, BPEL's mechanisms for handling software faults, selectively undoing certain process tasks (e.g., compensation), for canceling software tasks, and so on, do not automatically extend to invoked web services.

To address certain BPEL process modularization, reuse, and lifecycle management issues, an extension to BPEL, called BPEL-SPE (Web Services Business Process Execution Language—Subprocess Extension) may be used. BPEL-SPE is discussed in a joint white paper by International Business Machines Corp. (IBM) and SAP AG, entitled "WS-BPEL Extension for Subprocesses—BPEL-SPE," dated September 2005.

This BPEL-SPE extension specifies use of subprocesses to facilitate modularization and reuse of process logic fragments. However, conventional BPEL-SPE still employs a restrictive web service invocation model characterized by WSDL interfaces between the parent process and invoked subprocess. Parent processes and subprocesses are limited to single-variable exchanges via standard BPEL receive and reply activities over the WSDL interfaces. Furthermore, conventional BPEL-SPE requires an additional coordination protocol for status message exchange and life cycle management between a parent process and invoked subprocesses, which can further complicate implementation and increase runtime overhead and associated consumption of computing resources.

SUMMARY

An example method for enabling reuse of a portion of a business process includes employing a business process language to facilitate accessing a definition of a subprocess characterizing the process logic, wherein the definition indicates one or more parameters to be used by the subprocess to implement a task specified by the process logic; and employing the definition to facilitate: using one or more variables of a parent process as one or more arguments that are passed to an instantiated version of the subprocess, and mapping the one or more arguments to the one or more parameters.

In a more specific embodiment, the example method further includes characterizing a behavior of the subprocess via one or more dynamic scoping rules. The business process language includes a version of Business Process Execution Language (BPEL). The example method further includes employing a BPEL extension activity to facilitate accessing the subprocess definition.

Mapping further includes assigning the one or more parameters to the one or more variables indicated by the one or more arguments, thereby implementing passing by reference of the one or more variables from the parent process to the subprocess. Mapping may further include, and/or alternatively include assigning one or more parameters to one or more copies of the one or more variables indicated by the one or more arguments, thereby implementing passing by value of the one or more variables from the parent process to the subprocess.

The example method may further include accessing a definition of a call activity to enable calling the subprocess from the parent process. A call activity statement used to initiate a call activity includes the one or more arguments set with the one or more parent process variables. One or more attributes may be included in a call activity statement (also called a reference to a call activity) to characterize one or more call activity arguments and associated subprocess parameter(s), the parameter(s) of which is/are to be mapped to the one or more parent process variables.

The one or more attributes may include a from-spec initializer that is adapted to initialize one or more subprocess parameters via one or more corresponding call activity arguments. The from-spec initializer represents an optional attribute for optionally setting a default value for a parameter of the subprocess.

The example method further includes determining if a parameter initialized by a from-spec initializer represents a parameter mapped to a variable supplied via the reference to the call activity, and then selectively overwriting an initialized value of the parameter with a value specified via the variable in response thereto. The reference to the call activity (i.e., call activity statement) may further include one or more attributes characterizing whether the mapping is to implement passing by reference or passing by value of the one or more variables to one or more parameters of the subprocess.

The example method may further include employing the subprocess to access one or more variables of the parent process that are not passed via one or more arguments to the subprocess, but are instead in a scope of the parent process characterizing the reference to the call activity in the parent process. An instantiated version of the call activity may be employed to pass plural variables to the subprocess via the plural arguments indicated in a call activity statement and in accordance with the one or more attributes.

The example method may further include detecting when the call activity statement lacks specification of an attribute indicating whether the mapping is to implement passing by value or passing by reference, and employing passing by reference as a default when the call activity lacks the specification.

The subprocess is adapted to employ the code fragment representing the process logic and included in the subprocess definition to perform an operation on the one or more variables or on copies of the one or more variables, via the one or more parameters, when the one or more variables are passed by reference or by value, respectively, to the subprocess from the parent process. The one or more variables may further include one or more partner links, enabling a subprocess to manipulate communications between the parent process and one or more web services called thereby.

The definition of the subprocess may include or represent a definition of a standalone subprocess. The definition and packaging of the standalone subprocess is adapted to enable a subprocess model to be shared simultaneously among plural parent processes, which may be part of similar or different composites, which may be in similar or different deployment units or domains.

In addition, the definition of the subprocess may include or represent a definition of an inline subprocess. The definition of the inline subprocess may be included in computer code characterizing the parent process. The definition of the inline subprocess, when instantiated, is characterized by a child scope of a parent process that calls the subprocess via a call activity statement included in computer code of the parent process.

In general, definitions of subprocesses discussed herein are further adapted to allow a portion of the subprocess to call the subprocess itself, thereby facilitating recursion. Furthermore, it is possible for a standalone subprocess to call an inline subprocess defined as part of a parent process used to call the standalone subprocess, if the inline subprocess is in a scope of a call activity statement used to call the standalone subprocess.

Hence, certain specific embodiments discussed herein afford particular advantages by employing an extension to standard BPEL that is tightly aligned to BPEL scope tree behaviors and accompanying process life cycle models, in part, via use of dynamic scoping. Accordingly, subprocesses may inherit native BPEL compensation and fault handling functionality.

In general, subprocess definitions as employed by methods herein are not restricted by web service input/output restrictions, e.g., the subprocesses are not limited to operating on or with a single copy of an input variable. In addition, only a single instance of a given subprocess model need be loaded, i.e., created, after which, the instance of the model may be shared among plural active processes. Note however, that logically, a subprocess instance whose scope has been grafted to a parent process may be considered as part of the instance of the parent process. Furthermore, note that such scope grafting consumes no network resources and few other computing resources, relative to web service invocation.

Hence, certain embodiments discussed herein and accompanying subprocess definitions and call activities enable reuse of process logic in a business process and across business processes and any associated composites. Such subprocesses may facilitate efficient access to data from a parent process, while participating in built-in life cycle management functionality of the parent process, without the need for a special protocol.

Furthermore, by enabling passing of variables as call activity arguments by reference, performance and space advantages may be gained by obviating the need to copy large document variables. In addition, subprocesses may update plural parent process variables, thereby obviating the need for explicit return variables from a subprocess to a parent process.

In addition to reduced memory footprint and reduced or eliminated invocation overhead, as compared to a conventional business process, business processes employing subprocess as discussed herein may be easier to manage, maintain, correct, and update. Potentially thousands of parent process code fragments may be reduced to simple calls to reusable subprocesses that encapsulate the process logic of the code fragments.

Subprocesses defined herein may further facilitate overall process customization, such that certain modifications or updates to parent process behavior can be made via changes to subprocesses instead of via direct changes to process code. This enables a lightweight approach to process customization.

In summary, certain embodiments and accompanying subprocess definitions discussed herein facilitate readily manageable subprocesses that facilitate efficient modularization and reuse of process logic. Use of such subprocesses as discussed herein may further facilitate software development, deployment, and execution in various networked computing environments.

A further understanding of the nature and the advantages of particular embodiments disclosed herein may be realized by reference of the remaining portions of the specification and the attached drawings.

DETAILED DESCRIPTION OF EMBODIMENTS

Figure 1:
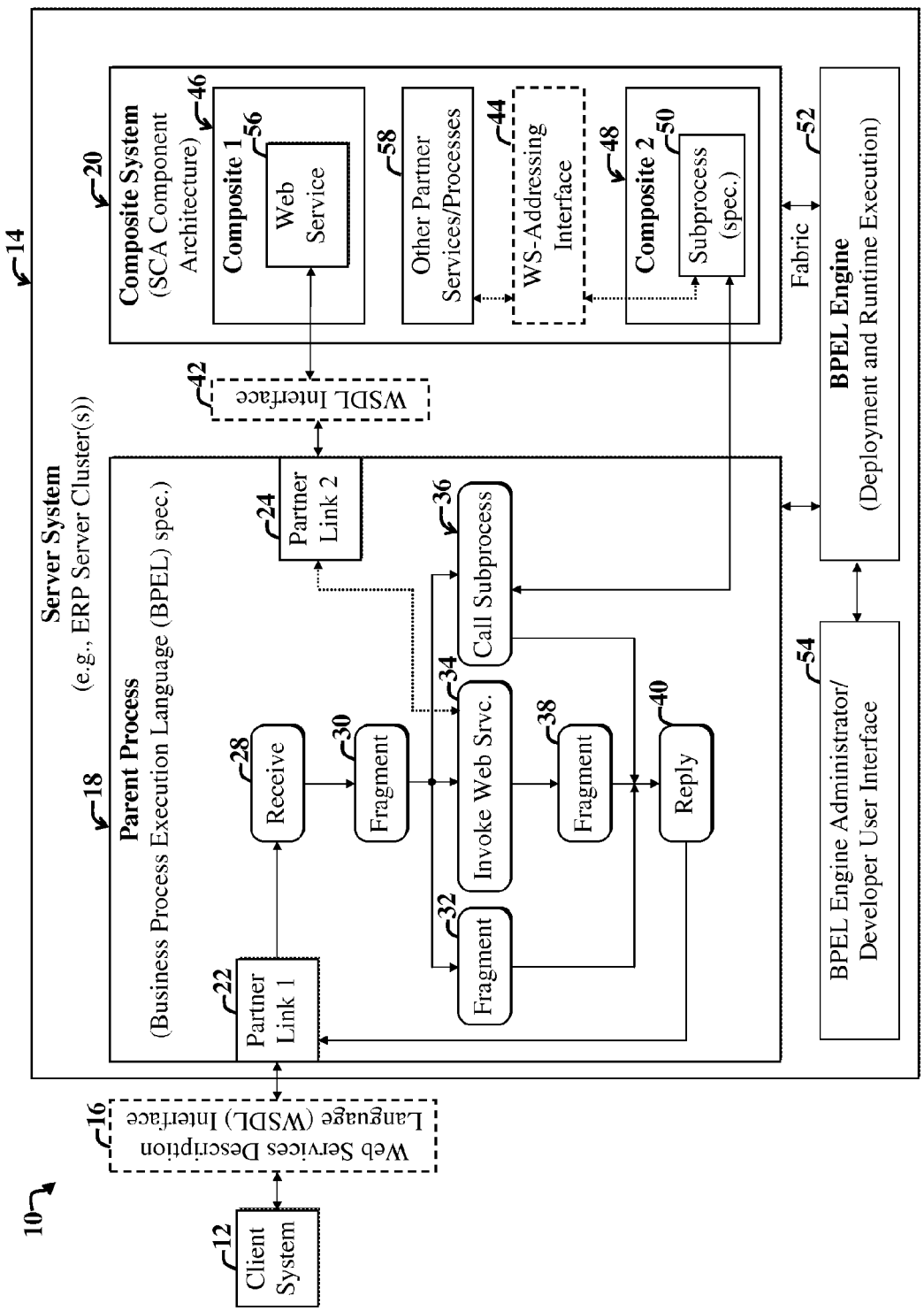
FIG. 1 is a block diagram illustrating an example enterprise computing environment and accompanying system implementing a parent process that calls a subprocess.

For the purposes of the present discussion, a process may be any sequence of one or more steps or tasks performed by a computer in accordance with computer code. Hence, execution of a function of an application may involve implementing a process.

A business process may refer to any process or software task performed in association with ERP software or that is otherwise used to facilitate implementing a task/activity for a business or organization. A given process, e.g., business process, may include subprocesses. Certain processes and subprocesses may include one or more software services, e.g., web services, also simply called services herein.

The term "process" may refer to a performed activity or collection of performed activities or actions, and/or may refer to computer code and accompanying process logic used to implement the activities or actions. An example of a business process includes launching software to facilitate processing an order, including generating an invoice and coordinating shipping. Depending upon the context, the term "business process" may also refer to the launched software and its accompanying computer code.

A business process may include an associated business process definition and accompanying process logic specifying how to coordinate interactions between a process instance (e.g., parent process instance) and its partner processes, which may represent subprocesses or child subprocesses.

Business processes may include data-dependent behavior. For example, an expense report handling business process may employ different approval steps, depending on the amount of the expense claim, business role of the claimant, and even the current financial 'posture' of the company.

For the purposes of the present discussion, a web service may be any computer code and associated functionality that is adapted to be called by an application or other service or process whose code is stored in a separate location (e.g., on another computer or memory storage location or device) from the software service and whose interface with the software service includes a Web Services Description Language (WSDL) interface.

Generally, web services, also simply called services herein, provide functionality, e.g., capabilities, that may be reused by different applications, processes, or web services (that may be distributed across a network), which access the functionality via a WSDL interface consistent with a description of the web service. A web services model may represent a loosely coupled integration model for allowing flexible integration of various network-distributed applications or processes.

Standard WS-BPEL 2.0 (also called conventional BPEL or simply BPEL herein) is discussed more fully in an Organization for the Advancement of Structured Information Standards (OASIS) standard entitled "Web Services Business Process Execution Language Version 2.0," dated Apr. 11, 2007, which is hereby incorporated by reference, as if set forth in full in this specification.

Conventional BPEL represents a language and ontology for facilitating business process orchestration, in part by specifying business process behavior based on web services. The ontology includes a BPEL business process integration model that facilitates integrating business processes and associated web services in various networked computing environments. BPEL extends web services interaction models to support stateful business transactions, in part by providing semantics for the specification of executable and abstract business processes.

BPEL specifies a portable execution format for business processes that relies on web service resources and eXtensible Markup Language (XML) data. A BPEL process may import and export data and functionality using web service interfaces, e.g., WSDL interfaces.

BPEL defines a model and a grammar for characterizing the behavior of a business process based on interactions between a process and any child processes, i.e., partners. Interactions between partner processes may occur through WSDL interfaces (i.e., web service interfaces). The structure of partner process interfaces and associated communications relationships is encapsulated via partner links.

WSDL represents an XML-based interface description language for describing web service functionality. A WSDL description of a web service (maintained in a WSDL file, also called a WSDL document) provides a machine-readable description specifying how a web service can be called and what messages can be exchanged with the web service.

A BPEL process connecting to a web service can read the WSDL file to determine what operations are available via the web service. XML Schema Definitions (XSDs) in the WSDL interface file may further specify datatypes and structures that may be exchanged. A BPEL process may employ XML and Simple Object Access Protocol (SOAP) or other WSDL-bound protocol to access a web service described in a WSDL interface file.

A BPEL process (e.g., BPEL business process), may represent a reusable definition that can be deployed in different ways and in different scenarios, while maintaining a uniform application-level behavior. A given BPEL business process may define how to coordinate the interactions between a process instance, also called the parent process, and its partner processes, which may be subprocesses or child processes of one or more parent processes that invoke or call the subprocesses or child processes.

Hence, a BPEL process may define how multiple service interactions with partner processes are coordinated to achieve a business goal, as well as the state and the logic necessary for this coordination. BPEL also introduces systematic mechanisms for dealing with business exceptions and processing faults. Moreover, BPEL introduces mechanisms for facilitating defining how individual or composite activities within a unit of work are to be compensated in cases where exceptions occur or a partner process or web service requests reversal.

BPEL business processes may be characterized by long-running interactions between business processes and web services, in which each interaction has a particular lifecycle, i.e., a beginning, defined behavior during its lifetime, and an end. BPEL business process semantics and methodologies are adapted to facilitate creating business process instances, terminating instances, compensating, i.e., undoing tasks performed by certain instances, and so on.

As suggested above, a BPEL process definition may provide and/or use one or more WSDL services, e.g., web services, and may provide the description of the behavior and interactions of a process instance relative to its partners and resources via WSDL interfaces. The BPEL programming language model is also adapted to enable descriptions of message exchanges experienced between business processes and web services, e.g., in part by supporting the specification of roles of partner processes and web services in a given interaction.

A BPEL process may reference port types of web services invoked by the process. However, possible deployment details pertaining to invoked web services need not be specified. Accordingly, bindings are not necessarily needed in WSDL documents characterizing partner process interfaces. Defining business processes in this way may facilitate reuse of business process definitions over multiple deployments of compatible services.

The standard WS-BPEL 2.0 process model is layered on top of the service model defined by WSDL 1.1. WSDL messages and XSDs provide the data model used by BPEL processes. XML Path (XPath) language and eXtensible Stylesheet Language Transformations (XSLT) provide support for data manipulation. External resources and partners are conventionally represented as WSDL services. BPEL provides extensibility to accommodate future versions of these standards, including XPath standards and related standards used in XML computation, as discussed more fully below.

Each BPEL business process is characterized by one or more activities, which may include BPEL elements, e.g., <receive>, <reply>, <invoke>, <flow>, <sequence>, <scope>, for defining similarly named activities. The invoke activity enables a business process to invoke a one-way or request-response operation on a port type offered by a partner. The flow activity element (<flow>) facilitates specifying one or more activities to be performed concurrently as part of a so-called flow activity. The sequence activity element facilitates specifying one or more activities to be performed sequentially as part of a sequence activity.

The scope activity element (<scope>) can be used to define a nested activity, where the nested activity may be associated with partner links, message exchanges, variables, correlation sets, and various handlers, e.g., fault, termination, and compensation handlers.

A BPEL extension activity element (denoted <extensionActivity>) facilitates extending BPEL by introducing a new activity type. A newly defined extension activity element must support standard BPEL attributes and elements.

In general, BPEL activity elements provide semantics for defining similarly named "activities," which include basic activities that describe elemental steps of process behavior, and structured activities that encode control-flow logic.

For clarity, certain well-known components, such as hard drives, processors, operating systems, power supplies, routers, Internet Service Providers (ISPs), Enterprise Service Busses (ESBs), client computers, and so on, have been omitted from the figures. However, those skilled in the art with access to the present teachings will know which components to implement and how to implement them to meet the needs of a given implementation.

FIG. 1 is a block diagram illustrating an example enterprise computing environment and accompanying system 10 implementing a parent process 18 that calls a subprocess 50. The example system includes a client system 12, also simply called the client, in communication with a server system 14, also simply called the server. The client system 12 may be a desktop computer, mobile device, or other computer or system running a browser or other software client. The server system 14 may be a single Service Oriented Architecture (SOA) server or a collection of servers, such as an Enterprise Resource Planning (ERP) server cluster or clusters.

For the purposes of the present discussion, an SOA server may be any server that is adapted to facilitate providing services or subprocesses accessible to one or more client computers coupled to a network. A server may be any computing resource, such as a computer and/or software that is adapted to provide content, e.g., data and/or functionality, to another computing resource or entity that requests it, i.e., the client. A client may be any computer or system that is adapted to send and, if necessary, receive content from another computer or system, called a server.

The client system 12 communicates with a process 18 running on the server system 14 via a first Web Services Description Language (WSDL) interface 16. A WSDL interface may be any mechanism for defining or characterizing communications between web services or other processes that employ WSDL receive and/or reply activities for communications therebetween. A WSDL interface and accompanying communications contract may be defined via a WSDL document file. The WSDL document may include WSDL characterizations of ports, such as WSDL message recipient ports and destination ports, descriptions a particular web service to be invoked by a WSDL invoke activity, and so on, as is well known in the art.

For the purposes of the present discussion, an activity, also called a software activity, may be a specific task that may be performed by software. WSDL and BPEL include semantics, such as tags (representing BPEL elements), to facilitate identifying, defining, and implementing activities. The term "activity" may also refer to, depending upon the context in which the term is used, the particular WSDL or BPEL tag used (e.g., in documents using WSDL, BPEL and/or an extension of BPEL); or may refer to the computer code contained between an opening tag and a closing tag; and/or may refer to the actual task or process logic to be implemented by the computer code contained within opening and closing tags, i.e., elements.

Various embodiments discussed herein employ a newly defined extension activity, referred to as a "call activity," computer code of which is characterized by a <call> tag, also referred to as a <call> element. The term "element" may be considered as including the corresponding closing element and computer code included between the opening and closing elements. Hence, when discussing a <call> element, this implies existence of a closing element (e.g., </call>), where computer code included between the opening and closing elements specifies particular information, e.g., arguments, attributes, called subprocess, etc., with which to employ functionality associated with the call activity.

An activity may include additional functionality afforded via use of the similarly named element. Hence, for example, a call activity may be considered as including the associated call element. In certain instances herein, the terms "activity" and "element" may be used interchangeably to refer to the associated activity and accompanying semantics defining the associated element and activity.

The call activity is defined as an extension to standard BPEL, i.e., an extension activity, via an extension activity element (<extensionActivity>) thereof, as discussed more fully below. The term "standard BPEL" may refer to any version of BPEL that has been standardized, such as OASIS WS-BPEL 2.0.

For the purposes of the present discussion, the term "version of standard BPEL" may refer to any business process language that is consistent with standard BPEL, but may not necessarily represent an existing standard, i.e., may instead include an extension to an existing standard. A business process language may be any computer code semantics and model adapted to facilitate implementing a business process in a networked computing environment, such as an enterprise computing environment.

The terms "standard BPEL" and "BPEL" may be employed interchangeably herein depending upon the context in which the terms are used. For example, in certain instances herein, the term "BPEL" may refer to a version of BPEL that has been extended to work with subprocesses discussed herein. However, the extended version of BPEL may also be called "extended BPEL."

While various embodiments discussed herein employ one or more extensions to standard BPEL to facilitate implementing subprocesses and calls thereto, embodiments are not limited thereto. Those skilled in the art with access to the present teachings may readily adjust embodiments discussed herein to work with a different type of business process languages, without departing from the scope of the present teachings.

For the purposes of the present discussion, a Subprocess BPEL extension (SBPEL) file may include any XML namespace that includes a specification of an extension to standard BPEL that defines an ontology for implementation of subprocesses, including call activities, behaviors, and other functionality characterizing subprocesses. New elements and associated activities (e.g., <bplex:call>) defined in such namespaces may be embedded between standard BPEL extension activity elements (<extensionActivity> . . . </extensionActivity>), i.e., may be specified as a BPEL extension activity.

A subprocess activity (e.g., identified via a <subProcess> element) and associated element may be a root activity of a particular subprocess specification. Hence, a subprocess element (e.g., <subProcess> or <inlineSubProcess>) represents an extension to standard BPEL, wherein the subprocess element is the root element for a subprocess definition. Like call activities, subprocess activities are embedded in an extension activity (i.e., enclosed via an <extensionActivity> element).

The process 18 communicates with a web service 56 in a first composite 46 via a second WSDL interface 42. A subprocess 50 in a second composite 48 is effectively made part of the parent process 18 at runtime, e.g., via scope grafting by a runtime engine (e.g., BPEL engine 52) in accordance with dynamic scoping rules, as discussed more fully below. Accordingly, no WSDL interface between the parent process 18 and subprocess 50 is required.

The subprocess 50 may converse with partners, e.g., other processes 58 that might ordinarily be called from a parent process via web service invocation. The communications may occur via a WS addressing interface 44 and may include synchronous (in and out) or asynchronous (in only) messaging. Any partner link(s) for such interactions between a subprocess and partner process or child process of the subprocess may be passed via one or more call activity arguments from parent process to the subprocess 50. Alternatively, or in addition, such partner links may be defined and configured within the specification, i.e., definition of the subprocess 50. Accordingly, a mix of caller-provided and subprocess-provided partner links is possible.

For an asynchronous request from the subprocess to another partner process 58, a conversation identification for a normalized WS-addressing message may be sent to the partner service 58 along with instance identification (parent process instance ID) identifying an instance of the parent process 18, thereby facilitating routing of callback messages to the right instance of the parent process 18. Note that the other partner services and/or business processes 58 may be part of one or more composites, e.g., the first composite 46 or the second composite 48. WS-addressing supports the use of asynchronous interactions by specifying a common SOAP header containing an EndPoint Reference (EPR) to which the response is to be sent.

For the purposes of the present discussion, a WS-addressing interface (also called WS-Addressing interface), such as the interface 44, may be any interface between entities (e.g., web services, processes and subprocesses, etc.) that employs a transport-neutral mechanism to communicate addressing information between entities.

In the present specific embodiment, the example WS-addressing interface 44 employs a structure for communicating a reference to an endpoint address (e.g., as specified via an absolute Uniform Resource Identifier (URI)) of the subprocess 50 and/or parent process 18, and a set of message addressing properties that associate addressing information with a particular message.

WS-addressing in general may provide a standardized method for incorporating message routing data within SOAP message headers. Hence, instead of relying on network-level transport to convey routing information, a message utilizing WS-addressing across as WS-addressing interface may contain dispatch metadata in SOAP message headers. The network-level transport facilitates employing a URI of a dispatcher to delivering the SOAP message to the dispatcher. The dispatcher uses the WS-addressing metadata to facilitate routing the message.

A WS-addressing interface, such as the WS-addressing interface 44, may define endpoint location information (e.g., a reply-to address) specifying the location at which a BPEL client, e.g., the subprocess 50 and/or parent process 18, is/are listening for a callback message, e.g., from another partner service 58. The WS-addressing interface 44 may further provide for a conversation ID and use of Transmission Control Protocol (TCP) tunneling to facilitate viewing SOAP messages exchanged between communicating entities. A software listener (TCP tunnel) may facilitate forwarding and displaying messages sent between the entities.

Those skilled in the art with access to the present teachings may readily construct an appropriate interface, e.g., WS-addressing interface, to facilitate communications between a subprocess (and/or accompanying parent process of which it is a part) and one or more other partner processes, to meet the needs of a given implementation, and without undue experimentation.

For the purposes of the present discussion, an asynchronous request may be any reference (by a referencing process, e.g., the parent process 18), to a computing resource, such as a service or subprocess (e.g., the subprocess 50), which does not act to pause the requesting process (at the time of issuance of the request) until completion of a task to be performed by the computing resource.

The first composite 46 and the second composite 48 are part of a composite system 20 hosted by the server system 14. A business process runtime engine (BPEL engine) 52 communicates with the parent process 18 and the composite system 20, including the composites 46, 48 thereof.

For the purposes of the present discussion, a composite may be any collection of services, processes, subprocesses, components, or other functional modules or components. A web service composite may be any web service that is assembled from one or more other web services. Depending upon the context in which the term is used, the term "composite" as used herein may refer to the functionality contained in a composite file or group of composite files and/or may refer to the files or the computer code in included in the files themselves.

A composite may include components that can run in a single process, on a single computer, or that can run as a distributed process, i.e., a process distributed across multiple processes on multiple computers. A complete software application, such as a business process constructed via a process template and configuration plan file, may be constructed from one or more composites, wherein components of a given composite may use similar or different technologies.

A business process engine (also called a processor), such as the BPEL engine 52, may be any collection of functionality adapted to provide a runtime environment for deploying and executing a business process. The terms "business process runtime engine" and "business process engine" may be employed interchangeably herein.

The BPEL engine 52 may include or represent a BPEL processor that includes computing resources (e.g., hardware, memory, network bandwidth, etc.) that are adapted to interpret or compile business process computer code and to facilitate deploying and initiating execution of and/or running of a business process. The BPEL engine 52 may act as a type of middleware.

A BPEL engine administrator/developer user interface 54 communicates with the BPEL engine 52 and may include graphical user interfaces and accompanying functionality for facilitating developing, orchestrating, and deploying collections of web services, processes, and subprocesses.

In the present example embodiment, the parent process 18 includes a first partner link 22 that tracks and facilitates communications between the parent process 18 and the client system 12 via the first WSDL interface 16. For the purposes of the present discussion, a partner link between two entities may be any mechanism for characterizing an interaction between two entities (e.g., two web services, or a parent business process and an invoked web service, i.e., child web service).

Partner links may facilitate maintaining and providing information identifying or otherwise characterizing the entities that are communicating or that may communicate via an interface, such as a WSDL interface and/or WS-addressing interface. A partner link may be visualized as a way for a particular entity, such as a web service, to point at another entity, such as another web service, with which communications may occur.

Note that while a WSDL interface file (also called a WSDL document) that defines the WSDL interface 16 may fully characterize a service, such as the parent process 18. The WSDL file may specify or define interactions and/or relationships occurring via the WSDL interface 16 via one or more partner links. Types of partner links used to communicate via a particular WSDL interface may be indicated in the associated WSDL file.

A partner link associated with an interface and characterizing an interaction between two entities may specify, for example, which linked entity is the consumer, and which linked entity is the producer, i.e., may specify roles for each communicating entity. Standard BPEL employs partner link types to facilitate defining partner links. More specifically, standard BPEL supports use of a partner link activity (via the <partnerLink> element), which can be associated with a particular partner link type (<partnerLinkType>).

Hence, a partner link type may describe message exchanges and relationships between communicating entities, e.g., services, including conversational roles played by each entity. WSDL port types that each role supports for an implementation of a particular interaction may also be specified or described by the partner link type. Partner link types can be used to represent dependencies between services or entities, despite whether or not a BPEL business process is defined for one or more of the services or entities.

A partner link may be a type of variable, i.e., partner links may be treated similarly to variables by subprocesses and associated call activities discussed herein, as set forth more fully below. Furthermore, correlation sets may represent a class of variables. Embodiments discussed herein may be readily adapted for use with certain types of variables that are not discussed herein, without departing from the scope of the present teachings.

For the purposes of the present discussion, a variable may be any portion of data, such as a value, partner link, correlation set, message, and so on. Examples of BPEL variables include messages of type WSDL message, XML Schema simple, and XML Schema element. Certain variables may be used to, for example, store messages that hold process state information. Accordingly, the term "variable" is used broadly herein and is taken to include any referenced artifacts, such as BPEL documents, WSDL documents, XML Schema Definitions (XSDs), partner links, correlation sets, and so on.

Note that various modules shown in the computing environment 10 may be grouped or arranged and linked differently than shown. For example, various modules may be combined into similar modules, or functionality represented therein may be rearranged and included in other modules or may be otherwise distributed across a network in a different fashion than shown, without departing from the scope of the present teachings. For example, the parent process 18 may be included in the composite system 20; the BPEL engine administrator/developer user interface 54 may be considered as part of the BPEL engine 52; the web service 56 may itself call a subprocess, such as the subprocess 50; the subprocess 50 may call another subprocess or web service, and so on.

For the purposes of the present discussion, process logic may be any set of one or more computer-implemented steps or programming language statements used to perform a task, such as a computation, data operation, or other software action or functionality. Portions of computer code may represent process logic. Such portions of computer code may be called process logic fragments. Accordingly, a fragment may be any portion or snippet of computer code. Typically, fragments discussed herein are fragments that include one or more units of process logic.

The parent process 18 includes various steps 28-40, which may correspond to BPEL activities and extended BPEL activities (e.g., a newly defined call activity employed in step 36), which are associated with different scopes, as discussed more fully below. Note that the parent process 18 does not represent a fully factored process, i.e., a process wherein all process logic fragments have been converted to reusable subprocesses. Repetitive fragments (e.g., fragment 30 and fragment 38) and use of the web service 56 are discussed herein to further illustrate how subprocesses can be used and how subprocesses differ from use of web services to implement process logic referenced by and used by the parent process 18.

In the present example embodiment, the various steps 28-40 include an initial receive step 28, which may employ a BPEL receive activity to enable receipt of an initial message from the client system 12 to trigger initiation of the process 18. A subsequent fragment 30 may include additional process logic, such as one or more standard BPEL activities and/or other steps, such as XPath data manipulations or XSLT operations, such as computations or file format transformations.

A second fragment 32 and a third fragment 38 occurring later in the process 18 may represent repeated versions of the first fragment 30. Accordingly, the fragments 30, 32, 38 may be candidates for encapsulation into a subprocess. When the fragments 30, 32, 38 are converted to a subprocess, process logic included therein may be replaced with a call activity referencing a subprocess that performs the process logic. If the code fragments 30, 32, 38 are large, encapsulation of the fragments may greatly reduce the size of and increase the readability and manageability of the file used to define the parent process 18.

After completion of the fragment 30, three steps 32-36 are performed in parallel, i.e., programming language code defining the steps 32-36 may be executed simultaneously. The steps 32-36, including the fragment 32, a BPEL web service invocation activity 34 (also simply called an invoke activity, which is specified via a BPEL <invoke> element), and a subprocess call activity 36 (<call>), may be part of a BPEL flow activity (<flow>) and may be characterized by similar scopes.

When the parent process flow encounters the invoke activity 34, an invoke message is sent to the web service 56 via a second partner link 24 and associated second WSDL interface 42. If the web service 56 is a synchronous web service 56, the web service 56 may employ both standard BPEL receive and reply activities to facilitate exchanging information with the parent process 18. If the web service 56 is an asynchronous web service, the web service 56 may employ a standard BPEL receive activity and an invoke activity to communicate with the parent process 18.

Note however, that the web service 56 and parent process 18 are limited to exchanging single input and output variables. These potentially large variables, when packaged as messages and sent to the web service 56, can result in consumption of substantial computing resources, including network bandwidth and memory used to copy the variables. Furthermore, native standard BPEL lifecycle management functionality governing the steps 28-40 of the parent process 18 may not extend to the web service 56. Accordingly, faults (other than WSDL declared Business faults) or other lifecycle information may not be communicated between the web service 56 and the parent process 18.

For the purposes of the present discussion, process lifecycle management functionality may be any functionality adapted to control a lifecycle of a process and components or portions thereof, such as by handling of process, scope, and services termination, activity or task compensation, process events, such as faults, exits, and other errors and life-cycle related events, and so on.

For the purposes of the present discussion, functionality may include any function or set of functions, actions, operations, or mechanisms for performing a task (or other capability) via software. The term "functionality" may further include any user interface controls, or features and any hardware or software modules, device components, and so on, that perform or otherwise enable one or more functions, capabilities, or tasks.

Functionality may also include that which is accessible via use of a user interface, and accompanying user interface controls and features, e.g., functionality provided via the BPEL engine administrator/developer user interface 54. Such functionality may further include actions, such as retrieving data pertaining to a business object; graphically depicting steps or scopes of a business process and accompanying interfaces, web services and partner links, to facilitate business process and composite construction, and so on.

For the purposes of the present discussion, the term "subprocess instance" may refer to an instance of a call activity within an instance of the parent process that calls the subprocess. In general, during a life cycle of a process (e.g., a parent process and accompanying subprocess or subprocesses) instance, the instance, along with its current state of execution may be saved in a database. When such a process instance and associated state information are moved from active memory (e.g., Random Access Memory (RAM)) and saved in a database, the process and any accompanying subprocesses are considered dehydrated. The database where the parent process and subprocess is saved is called a dehydration store.

When an instance of a process is dehydrated, the BPEL engine 52 may off load it from engine memory and into the dehydration store. When a certain event occurs, such as message to invoke the parent process 18 is encountered, the BPEL engine 52 locates and loads the dehydrated parent process 18, thereby rehydrating the parent process and associated subprocess 50 called thereby.

When the parent process flow encounters the call activity 36, functionality of the subprocess 50 may then be accessed by the parent process 18 after any scope grafting, e.g., as performed via the BPEL engine 52. Note that a subprocess may be considered dehydrated if the associated parent process is dehydrated. Furthermore, note that from the monitoring and management perspective, no new subprocess instance is created separately from the parent process instance. Instead, the subprocess instance may be represented by or correspond to an instance of a call activity in the parent process instance. In general, after scope grafting, a subprocess becomes logically part of an existing parent process.

Accordingly, subprocess resolution is performed when a parent process is first created. If the parent process is dehydrated, then the same component and version of the subprocess that was resolved at instantiation of the parent process will be used after rehydration. If that component version is not available due to it being undeployed (while the process was dehydrated), the parent process instance will be suspended with a linkage error.

The parent process 18 is said to represent a parent of the child subprocess 50. In general, a parent process may be any process that calls or invokes another web service or subprocess, called the child process or child subprocess.

Generally, a subprocess may be any code fragment or instantiated or running version thereof that is adapted to be called from another process, i.e., from the parent process, also referred to as the calling process. Two interacting processes, e.g., a parent process and web service invoked thereby may be called partner processes or partner services.

However, more specifically, the particular types of subprocesses discussed herein, e.g., the subprocess 50, represent encapsulated, i.e., modularized, reusable portions of process logic. The functionality of various subprocesses discussed herein may be accessed via a parent process via a call activity that may employ one or more arguments for passing one or more parent process variables by reference or by value to that subprocess in preparation for mapping the variables to one or more parameters in accordance with a mapping type. However, in certain implementations, call activity arguments are not needed for a parent process to use a subprocess, as discussed more fully below.

For the purposes of the present discussion, a mapping may be any specification characterizing how information characterizing a variable or other programming language construct (e.g., message) may be transferred to or referenced by another variable or programming language construct (e.g., a variable or parameter of a subprocess).

A mapping type may specify or be associated with a description characterizing mappings belonging to a particular category of mappings, where the category is determined by the description. For example, a "pass by reference" mapping type describes a category of mappings where a subprocess parameter is adjusted to refer to or be equivalent to a parent process variable to which it is mapped, e.g., via a particular call activity argument. Similarly, "pass by value" may represent another type of mapping, whereby a subprocess parameter is assigned to or otherwise refers to a copy of a parent process variable that is submitted to a subprocess via a call activity argument, as discussed more fully below.

Specific subprocesses discussed herein may include standalone subprocesses or inline subprocesses. Subprocesses that are specified in one or more separate files that may be accessible to one or more different parent processes are called standalone subprocesses. Subprocesses that are specified or defined in the code of a parent process are said to be defined inline, and are called inline subprocesses herein. A given subprocess may itself include one or more inline subprocesses, and/or may call one or more standalone subprocesses. Hence, various types of subprocesses discussed herein can be nested.

Hence, while the system 10 illustrates an example use case employing a subprocess 50, which represents a standalone subprocess, embodiments are not limited thereto. For example, in certain implementations, e.g., when the subprocess 50 is not to be shared with other parent processes, the subprocess may be defined inline in the parent process 18.

For example, the repeated fragments 30, 32, 38 may be candidates for replacement with an inline subprocess. In this case, an inline subprocess may be defined at the scope of the first fragment 30. The second fragment 32 and third fragment 38 could then be replaced with calls to the inline subprocess defined at the scope of the first fragment 30, provided that the second fragment 32 and third fragment 38 are within the BPEL scope of the first fragment 30.

The call activity 36 and associated functionality may be programmed by employing a new call activity element (<bplex:call>), the functionality, behavior, and semantics of which are defined via a BPEL extension activity (<extensionActivity>) specified in an XML namespace that is incorporated into the computer code of the parent process 18.

In general, activities beginning with the term "bplex:" (e.g., <bplex:call> and <bplex:subProcess>), which stands for "Business Programming Language EXtension," may be defined in an XML namespace, e.g., "xmlns:bplex=subprocess namespace URI." The namespace may be referenced in computer code of a file (e.g., an SBPEL file represented by the subprocess block 50) that defines or specifies process logic to be included in a particular subprocess.

For the purposes of the present discussion, a namespace may be any document, file, or other container used to name and characterize elements and/or associated attributes. A namespace may be used to provide an additional programming language vocabulary and/or accompanying model, i.e., ontology, that an existing language, e.g., standard BPEL may employ to facilitate implementation of a business process or subprocess. Note that by assigning different vocabularies to different incorporated namespaces, and incorporating and referring to those namespaces in a file defining a process or subprocess, any ambiguities between identically named elements or attributes can be resolved.

Generally, in example embodiments discussed herein, namespaces may be implemented via eXtensible Markup Language (XML) namespaces that employ XML documents in accordance with World Wide Web Consortium (W3C) recommendations.

Note that standard BPEL supports extensibility by allowing namespace-qualified attributes to appear on any BPEL element and by allowing elements specified in different namespaces to appear within BPEL defined elements. This is allowed, for example, in the XML Schema specifications for OASIS standard WS-BPEL 2.0. A standard BPEL process definition may employ XML Schema and WSDL to facilitate enabling defining of datatypes and service interfaces. Standard BPEL process definitions may also employ other constructs, such as partner link types, variable properties, property aliases, and so on, which may be defined within WSDL 1.1 documents using the WSDL 1.1 language extensibility feature thereof.

Note that in example embodiments discussed herein, programming language vocabulary (e.g., BPEL variable names) not associated with a particular namespace are called non-qualified or simple vocabulary. A non-qualified variable name that is used in a BPEL process definition that does reference a namespace is called an "NCname" or "simple name."

Similarly vocabulary associated with a particular namespace is considered qualified. For example names that are associated with namespaces are called Qualified (Q) names, i.e., QNames. A QName may be specified as a combination of an NCname and a reference to an associated namespace. For example, the name "bplex:NCname" represents a QName defined in an incorporated namespace called "bplex." Vocabulary defining "bplex:" may rely upon another namespace (e.g., beginning with "xmlns:"). Accordingly, the name "xmlns:bplex:NCname" may represent a fully qualified name.

For the purposes of the present discussion, a call activity may be any reference to a subprocess or other functionality, adapted to trigger activation or use of the subprocess or functionality. The term "call activity" may be considered to include the computer code used to define a call activity and to specify the subprocess or other functionality to be activated by the call activity. Furthermore, the terms "call activity" and "call activity statement" may be employed interchangeably to refer to a portion of computer code that references or accesses a call activity, i.e., call activity functionality.

The call activities detailed herein represent special call activities that may include plural arguments that may be populated with plural variables of a parent process. The plural variables may be passed to a subprocess and may be mapped to one or more parameters of the subprocess via a mapping. The mapping, which may be, for example, a pass by reference or pass by value mapping, may be specified via one or more attributes included as part of a particular call activity, i.e., as specified in computer code defining or characterizing the operation of the calling activity, as discussed more fully below. The terms "calling activity" and "call activity" may be employed interchangeably herein.

Note that exact details pertaining to call activity functionality, other than those provided herein, may be implementation specific and may vary, without departing from the scope of the present teachings. For example, in certain implementations, call activity statements may accommodate version information identifying a particular version of a definition of functionality associated with a call activity element, whereas in other implementations, version information is not needed. Those skilled in the art with access to the present teachings may readily encode namespaces to define new activities and associated elements and accompanying behaviors and functionality needed to support programming, i.e., defining subprocesses for use with parent processes, inline subprocesses, web services, and so on, without undue experimentation.

The call activity discussed herein and employed, for example, by the call activity step 36, may be programmed via a call activity element (e.g., <bplex:call>), which may accept one or more arguments and attributes. The arguments may be associated with variables of the parent process 18, the variables of which are to be mapped to parameters of the subprocess 50 in accordance with corresponding mapping attributes. A mapping attribute may specify, for example, that variables of the parent process 18 that are associated with call activity arguments via a call activity statement are to be mapped to parameters of the subprocess 50 via passing by value or passing by reference. If for a particular call activity argument, no mapping attribute is provided in the associated call activity statement used to access call activity element functionality, then the mapping defaults to pass by reference for that particular call activity argument. Note that other call attributes of a call activity specify which subprocess to call, and, optionally, which version and/or composite to use.

The subprocess 50 may then employ mapped parameters to perform calculations, operations, or other manipulations on the parameters. In the case of passing by reference, subprocess operations on the parameters effectively represent subprocess operations on the variables that have been passed by reference. This functionality may reduce or eliminate the need to make redundant copies of large variables to be passed between the parent process 18 and subprocess 50.

Hence, for the purposes of the present discussion, the term "pass by reference" may mean any transfer of information from a first entity (e.g., the parent process 18) to a second entity (e.g., the subprocess 50), where the information is not copied in the process, but is instead referred, e.g., by name or via another memory address pointer. Hence, in the present example embodiment, when the information to be "passed" represents a variable, the name of the variable is passed to the subprocess, and the subprocess maps its corresponding parameters to the variables by assigning the names of the variables to the parameters or otherwise renaming the parameters to refer to the variables.

In this way, passing by reference enables the subprocess 50 to directly update or manipulate variables of the parent process 18, without requiring the copying of variables. Hence, passing by reference (which is the default mapping in the present embodiment) enables the subprocess 50 to be particularly tightly coupled to the parent process 18, and obviating variable-copying overhead experienced by traditional web service invocation. Passing by reference, as discussed herein, is enabled in part via scope grafting, as discussed more fully below. This further removes single-variable messaging limitations of conventional web-service invocation models.

An attribute associated with an argument of a call activity, such as the call activity 36, may specify that a variable of the parent process 18 passed to the subprocess 50 via the argument is to be passed by value, also called "mapped by value." Accordingly, each call activity argument may be characterized by a different attribute. For the purposes of the present discussion, the term "pass by value" may mean any transfer of information from a first entity (e.g., the parent process 18) to a second entity (e.g., the subprocess 50), where the information is copied when passed to the second entity.

In the present example embodiment, when variables of the parent process 18 are specified as call activity arguments to be mapped, i.e., passed by value to parameters of the subprocess 50, then copies of the variables are made before the copies are assigned or mapped to corresponding parameters of the subprocess 50. This can be particularly useful when operations performed by the subprocess 50 are not to change or affect variables of the parent process 18.

The subprocess 50 may be defined using programming language vocabulary specified in a namespace and incorporated into or referenced by a file containing the computer code and accompanying statements defining the subprocess 50. The namespace may provide information characterizing and defining extension activity elements (e.g., <bplex:subProcess>) used to encode underlying subprocess functionality and capabilities upon which a subprocess definition relies. The file containing the computer code and accompanying process logic defining a particular subprocess (e.g., the subprocess 50) is called a Subprocess BPEL extension (SBPEL) file.

The subprocess namespace may also incorporate one or more other namespaces, which may facilitate defining standard BPEL activities and extension activity elements (e.g., <bplex:call>), which may be specified via use of a standard BPEL extension activity element (e.g., <extensionActivity>).

In the present specific embodiment, the element <subProcess> (also called <bplex:subProcess> herein) is an extension to standard WS-BPEL 2.0. The element <subProcess> represents the root element for a subprocess definition specified in an SBPEL file. For the purposes of the present discussion, the terms "definition of a subprocess" and "subprocess definition" are employed interchangeably herein and are taken include a specification of or definition of any extension activities or new elements used by the subprocess, e.g., as provided in one or more associated namespaces.

Note that exact namespace details may be implementation specific. Those skilled in the art with access to the present teachings may readily develop appropriate namespaces for a given implementation without undue experimentation.

A subprocess may be considered as a type of tProcess (as specified in the namespace http://docs.oasis-open.org/wsbpel/2.0/process/executable) defined as part of the OASIS WS-BPEL 2.0 standard, where the subprocess differs from a standard tProcess in various ways, including: variables (<variables>), including partner links (<partnerLinks>), immediately under the <subProcess> element can serve as parameters for the subprocess to be matched with call activity arguments; call activity arguments may be marked by setting an attribute "argumentRequired" to "yes" (where the default value is "no"); required subprocess parameters include parameters corresponding to required arguments of a call activity; a variable defined with an inline from-spec initializer serves as an optional argument, with a default value, and if the caller passes this argument, the caller-supplied value for the argument overrides the default value; subprocess validation functionality reports an error if a variable is referenced prior to setting a value of the variable if the variable is associated with a required argument; the first activity in a subprocess is not <receive> or <pick> with a create-instance attribute set to yes, since no instance of given subprocess is created, as a subprocess becomes logically part of an existing process instance after scope grafting (i.e., implementation of dynamic scoping rules), as discussed more fully below.

For the purposes of the present discussion, a from-spec initializer may be any computer code that is adapted to adjust a value of a variable via a from-spec. A from-spec may be any information specifying a source variable and/or expression language.

The one or more attributes may include a from-spec initializer that is adapted to initialize one or more subprocess parameters via one or more corresponding call activity arguments. The from-spec initializer represents an optional attribute for optionally setting a default value for a parameter of the subprocess. In various embodiments discussed herein, values of variables in a subprocess that have been initialized via a from-spec initializer are overwritten by values passed via call activity arguments.

When the subprocess 50 receives variables from the parent process 18 via arguments of the call activity 36; the BPEL engine 52 maps the arguments to parameters in accordance with a mapping type (e.g., pass by reference or pass by value), e.g., as specified in the call activity arguments and consistent with parameters in the subprocess definition; then process logic of the subprocess 50 is executed (e.g., via the BPEL engine 52) using the mapped parameters. The subprocess 36 then completes, and the grafted scope is completed, as discussed below.

Note that in the present example embodiment, when parent process variables are passed to the subprocess 50 by reference, no explicit return variables from the subprocess 50 to the parent process 18 are required, as the subprocess 50 may act to update one or more parent process variables. For these reasons, and due to scope grafting, as discussed below, subprocess as discussed herein, including a standalone subprocess or an inline subprocess, may be considered as part of a parent process that calls the subprocess.

After the parent process completes any remaining steps, such as the third fragment step 38, a parent process reply activity 40 facilitates sending a response message back from the parent process 18 to the client system 12 via the first WSDL interface 16 and associated partner link 22.

In the present example embodiment, the BPEL engine 52 includes computer code for facilitating compiling or interpreting computer code of the parent process 18 and composites 46, 48, including the subprocess 50; then running the parent process 18 and selectively running the accompanying subprocess 50 and web service 56. The BPEL engine 52 further includes computer code for determining when an instance of the parent process 18 is created; determining subprocess version information; grafting a root scope of the subprocess 50 onto a scope of the parent process 18; and resolving variables and references in a bottom-up fashion, starting with a most narrow scope of the subprocess 50 and working up to higher level scopes, until all variable references and activities are resolved, as discussed more fully below.

As suggested above, but discussed in more detail here, the call activity 36 may be specified via a call activity statement (e.g., beginning with a <bplex:call> element) included in a file defining the parent process 18. Information defining a call activity element (e.g., <bplex:call>) and associated functionality and behaviors may be effectively incorporated into the associated parent process at runtime by referencing or incorporating a namespace defining the call activity element, and by including appropriate BPEL extension activities used to define call activity functionality.

For the purposes of the present discussion, an extension activity may be any activity that is not specified by standard BPEL. An extension activity may be set forth via use of a BPEL extension activity element. Note that certain elements and attributes of XML namespaces other than those provided by BPEL can often be added to a BPEL process by incorporating a namespace that defines the element.

Example pseudocode for an example call activity statement used to call a subprocess is set forth between new call extension activity elements (<bplex:call . . . > . . . </bplex:call>) as indicated below:

```
<bplex:call xmlns:bplex="http://.../bpel/extension"
    target="any URI"
    version="xsd:string"?
    component="xsd:string"?
    standard-attributes >
    //standard-elements here
    <bplex:param name="NCname" (variable="NCname" |
        partnerLink="NCname") copyByValue="yes|no"? />*
</bplex:call>
```

Note that the term "call activity statement" is taken to include all of the computer code within a call activity, i.e., set forth between call activity elements.

With reference to the call extension activity pseudocode set forth above, the target specifies the subprocess to be called. Specific ways a target is specified and how the target value is treated are implementation specific and may vary, without departing from the scope of the present teachings. In the present example embodiment, the target (referred to as the call target) may specify a Uniform Resource Identifier (URI) for the subprocess component to be called or may specify the subprocess NCname if the subprocess to be called represents an inline subprocess.

The version specifies the composite revision to be used for the subprocess. In the present example embodiment, the subprocess inherits the revision of the composite, such that the version of the subprocess is considered to be the same as the version of the associated composite unless the call activity statement specifies particular revision information.

The component specifies a composite component (e.g., Service Component Architecture (SCA) component) from which the subprocess is to be loaded. This is used only to resolve subprocess name collisions, when multiple components are using the same QName.

The code portion "bplex:param/@name names" names a parameter from the subprocess.

The code portion "bplex:param/@variable" names an in-context variable from the process. This is used to set the value of the named parameter.

In the present example embodiment, only one @variable or only one @partnerLink can appear between a single pair of opening and closing <bplex:param> elements.

The code portion "bplex:param/@partnerLink" names an in-context partner link (i.e., in the scope of the parent process that includes the call activity statement) to be used by the subprocess. This code portion may be used to set the value of the named parameter.

The code portion "bplex:param/@copyByValue" represents a call activity attribute that specifies if the variable or partner link (specified via the <bplex:param> element) is to be passed to the called subprocess by value or reference. The default value of this attribute is "no," i.e., pass by reference is the default mapping or passing type. This may obviate the need to copy documents to employ functionality of a subprocess. Note that the terms "passing" and "mapping" may be employed interchangeably herein.

Note that call activity definitions or templates, such as that provided by the pseudocode above, may vary, without departing from the scope of the present teachings. For example, in certain implementations, additional arguments for handling correlation sets as arguments may be provided.

During execution, e.g., by the BPEL engine 52, the BPEL parent process instance executes the call activity within the parent process execution space and shares its state. The call activity triggers passing of control to the subprocess, at which time the subprocess scope is initialized with the argument variables indicated in the call activity.

Each parameter is copied (by reference or value, as specified) from the call activity to the subprocess scope.

Optional parameters (e.g., those with default values) that are not referred to in the call activity argument list are initialized with their default values.

In the present example embodiment, for calls to standalone subprocesses, all required parameters are supplied by the call activity. This is verified through static analysis.

All values supplied by the call activity arguments are type compatible with the corresponding variable (or partner link) defined in the subprocess. This is also verified through static analysis.

Each variable (or partner link) in the subprocess is set only once in a call activity argument list. This is also verified through static analysis.

On completion of the subprocess, control is returned to the parent process. Typically, execution continues with the next activity after the call activity.

In the case of abnormal subprocess completion the parent process will evolve the process according to the standard life cycle rules of the version of BPEL used to encode the parent process definition.

For the purposes of subprocess monitoring and management, no new process instance for the subprocess is created, since the subprocess instance is represented by the instance of the call activity in the parent process due to scope grafting, i.e., dynamic scoping, as discussed more fully below.

To reduce or eliminate linkage errors during runtime references are resolved on deployment of a process and subprocess into the service system or server cluster. Parameter lists are validated as a post-deployment activity. Pre-processing for creating a new parent process instance validates all subprocess references.

Example pseudocode for an example standalone subprocess activity statement used to define a subprocess (i.e., encode a subprocess to encapsulate business process logic and act as part of a parent process) is set forth between new subprocess extension activity elements (<bplex:subProcess ... > ... </bplex:subProcess>) as indicated below. The example subprocess below, which is defined in an SBPEL file containing a <bplex:subProcess> document (i.e., a document with the <bplex:subProcess> element as its root element), may represent a target of a call activity used to call it:

```
<bplex:subProcess name="NCname" targetNamespace="anyURI"
    xmlns="http://docs.oasis-open.org/wsbpel/2.0/process/executable"
    xmlns:bplex="http://schemas.oracle.com/bpel/extension" ...>
    // Partner links and variables serve as sub-process arguments:
    <partnerLinks>?
        <partnerLink name="NCname" partnerLinkType="QName"
            myRole="NCname"? partnerRole="NCname"?
            bplex:argumentRequired=["yes"|"no"]? />+
    <partnerLinks>
    <variables>?
        <variable name="BPELVariableName"
        messageType="QName"? type="QName"? element="QName"?
        bplex:argumentRequired=["yes"|"no"]?>+
        from-spec?
        </variable>
    </variables>
    // Standard BPEL process definition semantics may be included here,
        except no <receive> or <pick> activities with createInstance="yes"
        are specified here.
    //Specification of activities and process logic here, which may include
        standard BPEL activities, etc.
</bplex:subProcess>
```

Note that the <bplex:subProcess> element facilitates defining a standalone subprocess using certain semantics (and associated functionality) that are consistent with definitions of standard BPEL processes, as indicated in comments (// . . . ) included in the above pseudocode.

The element <subProcess> represents an extension to standard WS-BPEL 2.0. The <subProcess> element represents the root element for a subprocess definition. The name space for this element may be, for example, "http://schemas . . . /bpel/extension", where " . . . " may be any implementation specific URI or URL information.

In the present example embodiment, as suggested above, but discussed more fully here, a standalone subprocess, as exemplified by the above pseudocode may be of type tProcess, as defined in the WS-BPEL target name space "http://docs.oasis-open.org/wsbpe/2.0/process/executable", but may vary from a standard tProcess in various ways, including those set forth in items 1-7 below:

1. Variables (<variables>) and partner links (<partnerLinks>) immediately under a <subProcess> element can serve as arguments for the subprocess. Arguments are marked by setting the attribute "argumentRequired" to "yes" (where the default value is "no").

2. Required arguments/parameters for a subprocess may correspond to arguments required by a call activity that calls the subprocess.

3. A variable defined with an inline from-spec initializer serves as an optional argument, with a default value. If the caller passes this argument, the caller-supplied value for the argument overrides the default value.

4. BPEL engine validation functionality reports an error if a variable is referenced prior to setting value if it is not a required argument.

5. The first activity in the sub-process is not a receive or pick activity with "createInstance" set to yes. Note that no instance of a given subprocess type is created per se, since the subprocess logically becomes part of the instance of the associated parent process after scope grafting, as discussed more fully below.

6. The "subProcess/@name" attribute defines the name of the subprocess that is unique within the composite within which the subprocess and accompanying parent process are deployed.

7. In the present example embodiment, standalone subprocess may be considered as self-contained, such that, all variable and partner link references in the process fragment encapsulated by the standalone subprocess resolve to local definitions or arguments, i.e., either defined locally within the standalone subprocess or passed thereto. Note however, that implementations are possible, whereby a standalone subprocess can handle not references to non-local variables and partner links, provided that the variables and partner links are that are in-scope at the associated call activity, without departing from the scope of the present teachings.

Note that, in the present example embodiment, unlike standalone subprocesses, inline subprocesses are adapted to enable resolution of references to variables and partner links that are in-scope at the call activity.

Pseudocode for an example parent process accompanying inline subprocess activity statement used to define an inline subprocess is set forth below between new inline subprocess extension activity elements (<bplex:inline SubProcess . . . > . . . </bplex:inlineSubProcess>). The example inline subprocess embedded in the parent process below may be a target of a call activity whose scope has access to the parent process scope at which the inline subprocess is defined:

```
<process name="NCname" targetNamespace="anyURI" xmlns=
"http://docs.oasis-open.org/wsbpel/2.0/process/executable" ...>
    // Subprocess definitions appear prior to the WS-BPEL artifacts of the
        Process definition.
    // Inline sub-process definition at parent process root scope follows:
    <bplex:inlineSubProcess
        xmlns:bplex="http://schemas..../bpel/extension"
        name="NCname">*
        ...
        //Partner links and variables serve as sub-process arguments:
        <partnerLinks>?
            <partnerLink name="NCname" partnerLinkType="QName"
                myRole="NCname"? partnerRole="NCname"?
                bplex:argumentRequired=["yes"|"no"]? />+
        <partnerLinks>
        ...
        <variables>?
            <variable name="BPELVariableName"
                messageType="QName"?
                type="QName"? element="QName"?
                bplex:argumentRequired=["yes"|"no"]?>+
                from-spec?
            </variable>
        </variables>
        ...
        // Standard process activity graph here, except that no <receive> or
            <pick> activities with createInstance = "yes" are included here.
        //Activities.
    </bplex:inlineSubProcess>
    // BPEL code here stripped for brevity.
</process>
```

In the present example embodiment, the <inlineSubProcess> element is optionally a repeated child element under the parent process element (<process>), rather than the root element in a separate file. The inline subprocess name is unique within its parent process scope and sub-scopes of the parent process scope in which it is defined. Furthermore, the inline subprocess name is not visible outside of the parent process scope in which it is defined.

Figure 2:
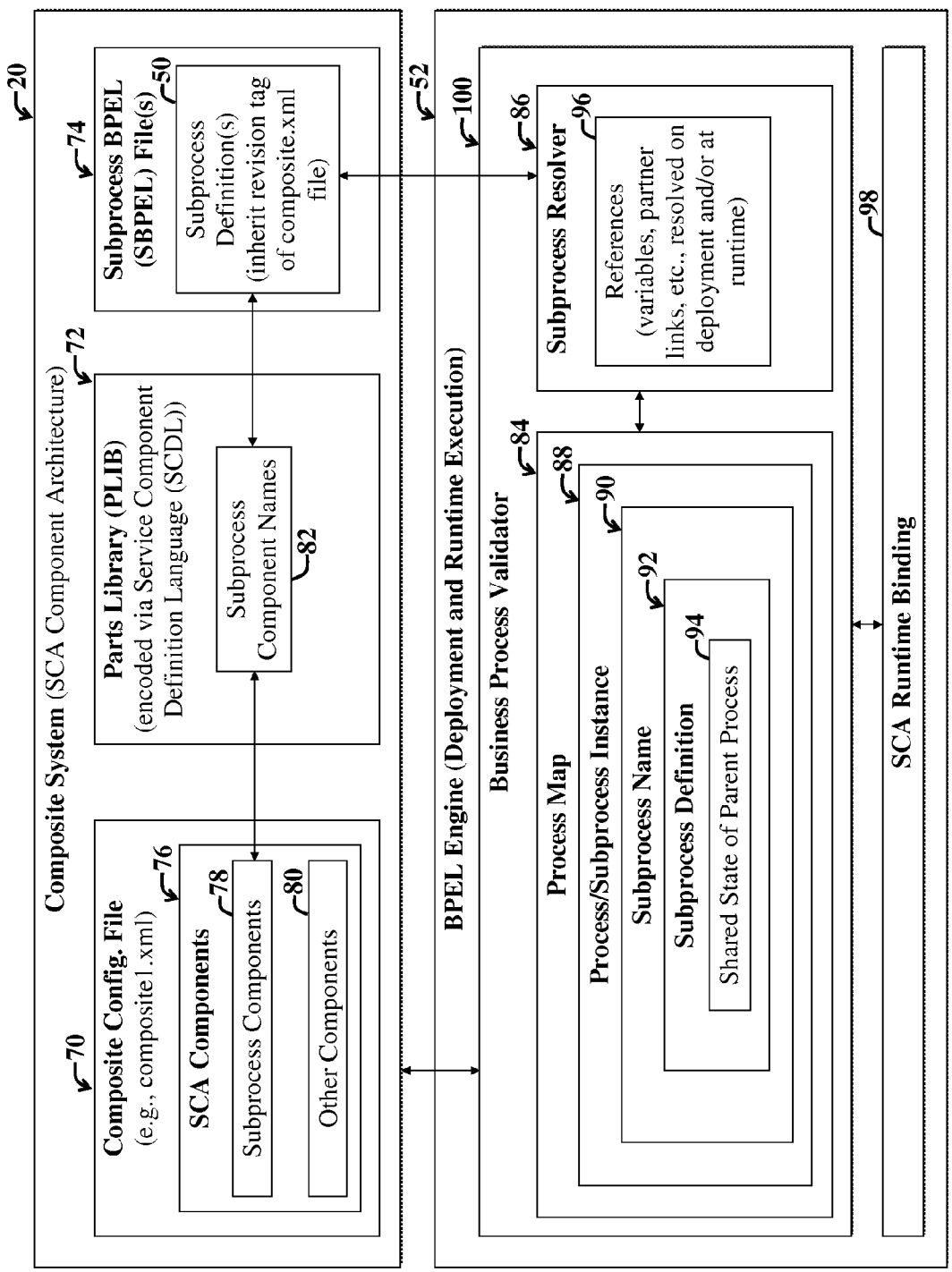
FIG. 2 is a block diagram illustrating key functional blocks of an example composite system that may be used with the system of FIG. 1.

FIG. 2 is a block diagram illustrating key functional blocks 50, 70-80 of an example composite system 20 and example functional blocks 84-100 of accompanying BPEL runtime engine 52, which may be employed by the system 10 of FIG. 1.

Note that the various blocks shown in FIG. 2 may be grouped and/or connected in different ways than shown, without departing from the scope of the present teachings. For example, in certain implementations, SBPEL file(s) 74 containing one or more subprocess definitions 50 may be included in a Parts LIBrary (PLIB) 72, as opposed to being merely referenced thereby. Furthermore, SCA components 76 in a composite configuration file 70 may be considered as including the SBPEL file(s) 74 and accompanying subprocess definition(s) 50 or copies thereof.

In the present example embodiment, the composite system 20 is implemented in accordance with a Service Component Architecture (SCA). Note however, that embodiments are not limited to the use of SCA or particular features of SCA.

For the purposes of the present discussion, a composite system may be any business language execution engine in communication with a composite service. A composite service may be any service that is assembled from other services.

SCA may be any software architecture or software model providing a framework and accompanying methodology for creating software components (e.g., SCA components) and describing how the components may work together, i.e., may interface or otherwise may be combined into complete composite applications or processes. The framework may facilitate aggregating (i.e., combining into composites) applications (e.g., sets of one or more components, such as web services, processes, or other components working together) using similar or different technologies, where the applications may be on different computers running different operating systems, and so on.

For the purposes of the present discussion, an SCA component may be a building block of a process and may represent an implementation of computer code for implementing functionality characterizing the building block. An SCA component may include a snippet or fragment of reusable code that behaves in a particular way. A component can also have validators, converters, and listeners attached to it to perform certain defined actions.

An SCA component, in addition to providing services to its own clients, may use services provided by other components in its domain or by software outside its domain (e.g., by using service references). Bindings, e.g., the SCA runtime binding(s) 98, specify how communications between the component and referenced services transpire. The SCA binding(s) 98 may defines a particular protocol that can be used to communicate with a particular referenced service.

Note that whenever a component is to use the services of other components, it uses references to the other components. Each reference may define an interface containing operations that the component is to invoke or call. Components can be combined into larger structures, i.e., composites. The composite configuration file 70 facilitates defining the composite application, e.g., via Service Component Definition Language (SCDL).

The composite system 20 is shown including a composite configuration file (e.g., composite.xml) 70, which includes SCA components 76, including subprocess components 78 and other components 80, such as parent process components. The subprocess components 78 may include and/or reference subprocess definitions in block 70, which may be maintained in the PLIB 72 and/or referenced by subprocess component name(s) 82 therein.

The BPEL runtime engine 52 includes a process validator 100 adapted to facilitate compiling or interpreting and validating business processes and associated web services and subprocesses. The validator 100 includes a process map 84, which may facilitate organizing processes, web services, and associated subprocesses and their accompanying references and links.

For illustrative purposes, the process map 84 is shown including information characterizing a process/subprocess instance 88, which is characterized by a subprocess name 90 and accompanying compiled subprocess definition 92 in association with state information 94 characterizing the shared state of the instance of the parent process and subprocess, which may logically be part of the same instance after scope grafting, i.e., dynamic scoping, as discussed more fully below.

A subprocess resolver module 86 may communicate with the process map 84 and maintain reference information 96, such as variable references, partner links, and so on, which are to be resolved at runtime. The subprocess resolver 86 may access subprocess definitions 50 and associated parent process definitions to facilitate resolving references in a bottom up fashion, i.e., starting with a local subprocess sub-scope and looking in, i.e., analyzing, subsequent higher level scopes, including parent process scopes until all variable references are resolved.

An optional SCA runtime binding module 98 may facilitate determining, at runtime, what bindings to use to facilitate communications between components of the composite system 20, particularly when such bindings are not specified via the composite system 20.

For the purposes of the present discussion, bindings may be any interfacing mechanism, such as metadata and accompanying computer code, which is adapted to facilitate communications between software components by specifying how communications between the components should occur. For example, bindings may be employed to allow software applications to be exposed as web services. Bindings may also specify exactly how communications should transpire between an SCA component and another entity.

Note that not all software components, e.g., SCA components, require explicit bindings. For example, a component that communicates with another component in the same domain, even a component in another process or on another machine, need not have any explicit bindings specified. Instead, the runtime engine 52 may reference the SCA runtime binding module 98 to determine what bindings to use.

However, in implementations involving applications or processes running in different domains, a developer may provide explicit bindings, e.g., defining a particular protocol that can be used to communicate with a particular process. A given process or service can have multiple bindings, enabling different types of applications to communicate differently. Bindings typically address how computing entities (e.g., processes) communicate rather what the entities do.

In the present example embodiment, the BPEL runtime engine 52 may act as a runtime composite management system, i.e., may include runtime composite management functionality, which is adapted to automatically manage version information for subprocesses, processes, composites, web services, extension elements and associated namespaces, and so on. Management of version information may include capturing information specifying versions for processes, namespaces, subprocesses, and so on, when an initial process employing the namespaces, subprocesses, and so on, is created.

For the purposes of the present discussion, a runtime composite management system may be any collection of functionality that is adapted to interpret, compile, and control or otherwise direct implementation of one or more composite business processes (also simply called composites herein).

Version management may include performing a complete sweep of references related to a given process, including analyzing each subprocess to determine which subprocesses, namespaces, other processes, web services, and so on a given subprocess refers to. Information about which versions and which references are employed in a given process implementation is stored, i.e., remembered along with state information pertaining to an associated business process instance. Such version management functionality may be facilitated via version management computer code incorporated in the subprocess resolver module 86.

Note that subprocess files may be packaged along with a parent process in a composite or packaged in another composite, such as a PLIB. Note that in certain implementations where standard SCA does not support particular requirements of a PLIB, that those skilled in the art with access to the present teachings may readily make appropriate modifications to the SCA and/or the PLIB to meet the needs of a given implementation, without undue experimentation.

Subprocesses in a composite may be enumerated in the composite configuration file (composite.xml) 70. Component element definitions 78 may associate a subprocess name with the SBPEL file 74 in which it is defined. During deployment, a fabric may delegate subprocess components to the BPEL engine 52. The BPEL engine 52 is adapted to then validate the parent process definition and accompanying subprocess definition(s) and builds the process map 84 using the subprocess target name as a key and the and the subprocess definition 92 as the value. Only one instance of a subprocess model needs to exist in the BPEL engine 52 despite the consumer count (i.e., the number of parent processes using the standalone subprocess). To facilitate optimizing memory, the BPEL engine 52 may selectively load (e.g., rehydrate) the parent process or unload (i.e., dehydrate) the parent process as needed.

Note that a given subprocess may be packaged in a composite, e.g., via the composite system 20, or accessed from another composite/repository. The latter model facilitates sharing subprocesses across composite applications.

In the present example embodiment, subprocesses are configured as components to enable use of various functionality. Note that the SCA infrastructure characterizing the composite system 20 supports configuring subprocesses as components (e.g., subprocess components 78) and associating BPEL engine target, e.g., the BPEL engine 52. Furthermore, the SCA composite system 20 is adapted to enable configuring partner links defined in a subprocess on the associated subprocess component, thereby facilitating reuse of subprocesses with a specified configuration.

Furthermore, the SCA composite system 20 is adapted to enable creation of plural reusable components for a given subprocess. This facilitates resolving subprocesses across composites, e.g., in absence of standard SCA 1.1 artifact resolution support.

When subprocess file(s) is(are) packaged it in a composite along with process files, corresponding component entries 78 are added to the composite configuration file 70. The component entries 78 may specify mappings of subprocess QNames to SBPEL files in which they are defined.

In the present example embodiment, at parent process instance creation, the BPEL engine 52 finds all <bplex:call> activities; resolves each target SCA component; and determines SCA composite revision for component. Resolutions that are persisted with a given process instance and are not changed after they are initially established after process instance creation. Upon any process (and accompanying subprocess) rehydration, the BPEL engine 52 checks resolutions to ensure referenced components remain.

Note that use of the PLIB 72 may result in packaging of subprocess files into separate composites from a parent process. This may facilitate roll-out of new versions of subprocess, thereby facilitating customizing, updating, or otherwise modifying parent processes that call particular PLIB-packaged subprocesses. Note that various tools, e.g., editors for facilitating packing PLIB s are readily publically available.

Note that a PLIB may represent a type of composite, i.e., collection of one or more software components and/or references thereto. Accordingly, a subprocess packaged in a PLIB may inherit the revision tag of the PLIB composite. Note that mechanisms other than PLIBs may be employed to construct composites that accommodate subprocess definitions, without departing from the scope of the present teachings.

The PLIB may 72 may be constructed in accordance with the International Standard for Organization (ISO) standard 13584 standard for parts libraries (PLIB), which is hereby incorporated by reference as if set forth in full in this specification.

Note that in implementations involving use of PLIBs, PLIB-packaged subprocesses may be deployed before instances of parent processes referencing are deployed.

Figure 3:
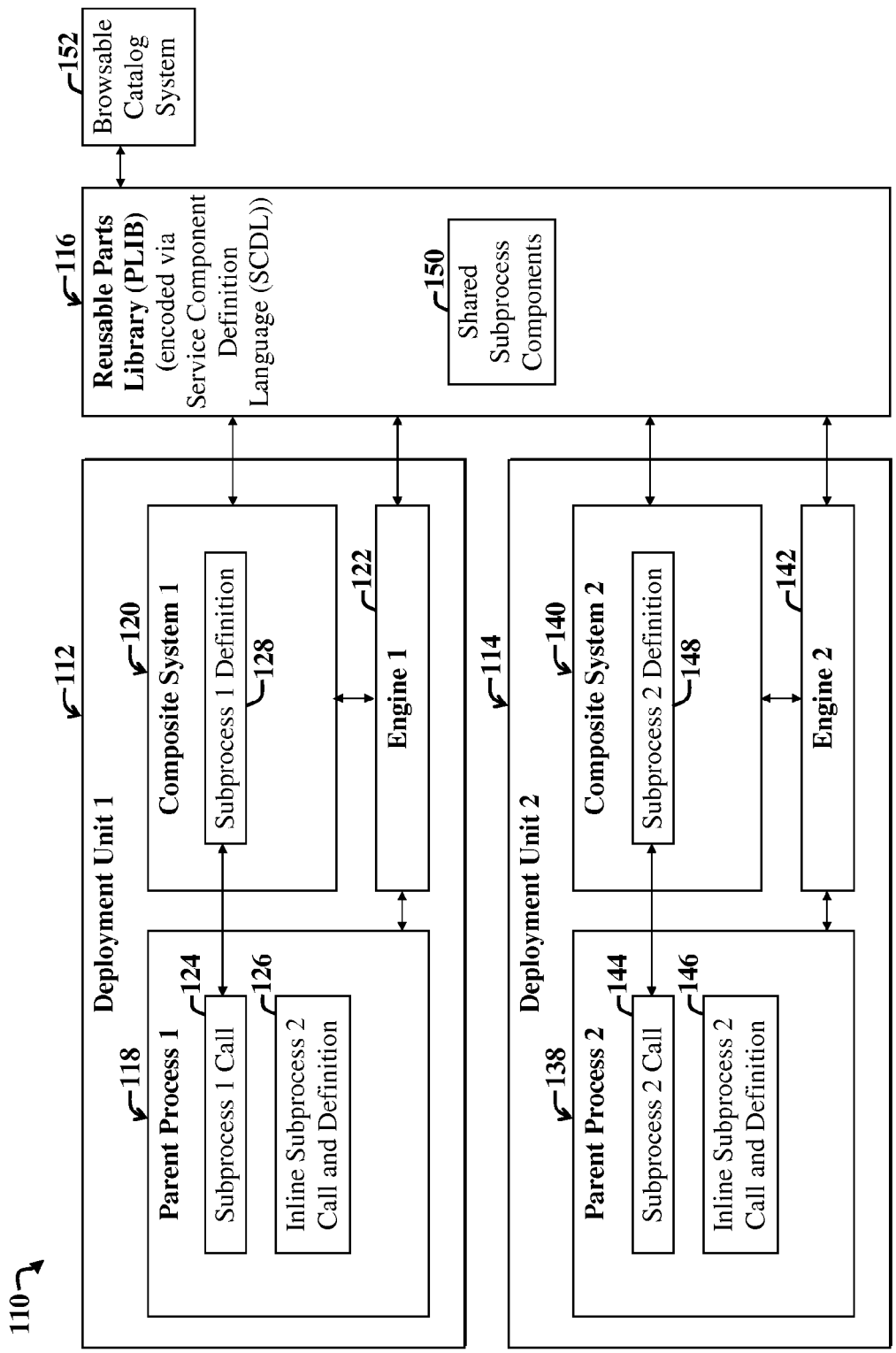
FIG. 3 is a block diagram of an example implementation of a system that shares a subprocess component across composite deployment units.

FIG. 3 is a block diagram of an example implementation of a system 110 that shares one or more subprocess components 150 across composite deployment units 112, 114, i.e., domains. For the purposes of the present discussion, a deployment unit or domain may be any collection of computing resources, such as business processes, that share a given runtime engine or collection of similarly typed runtime engines, also called runtimes.

The system 110 may be implemented in accordance with various SCA principles. In this context, a given computing environment that includes a collection of SCA applications or runtimes from a single vendor may be considered to represent a domain. A given SCA domain may have various software applications and processes sharing a common runtime management system and/or associated technology.

Note that various modules in the deployment units 112, 114 may be run on different machines distributed across a network. Furthermore, the deployment units 112, 114 may include plural composites (i.e., more than those shown), each with one or more components, which may be implemented on plural computers.

The example deployment units 112, 114 include a first example deployment unit 112 and a second example deployment unit 114, which share access to a reusable PLIB 116. The PLIB 116 maintains shared subprocess components 150.

An optional browsable catalog system 152 may include a user interface and accompanying features and functionality for browsing available subprocesses 150 for use in process development; for accessing and editing subprocesses to facilitate customization and/or updating of parent processes by virtue of modifications to subprocesses, and so on. The browsable catalog system 152 may communicate with or be included as part of a process development environment or system.

The first deployment unit 112 includes an example first parent process 118, which includes a first standalone subprocess all activity 124 and an inline subprocess call activity and accompanying inline-subprocess definition 126.

The first subprocess call 124 is to a standalone subprocess 128 that is defined and/or referenced in the first composite system 120. In the present example embodiment, the first composite system 120 is adapted to selectively retrieve the first subprocess definition from the PLIB shared subprocess components 150, which is then run within the first deployment unit 112 via a first runtime engine 122. Alternatively, the first runtime engine 122 resolves the first subprocess call 124 directly with a subprocess definition maintained in the PLIB 116 and shared with another running instance of the subprocess in the second deployment unit 114.

The first runtime engine 122 communicates with computer code of the first parent process 118 and the composite system 120 to facilitate compiling or interpreting, performing subprocess scope grafting. The first runtime engine 122 may also selectively access the PLIB 116 to resolve any subprocess calls made in the parent process 118 to subprocesses that are not defined locally within the first deployment unit 112, but are instead defined in the PLIB 116 among the shared subprocess components 150.

The construction and operation of the second deployment unit 114 may be similar to that of the first deployment unit 112, where various modules 138-146 of the second deployment unit 114 may be similar to the corresponding modules 118-126 of the first deployment unit 112, with the exception that the modules 118-142 may be from a different vendor and may employ different sets of technologies.

Note that the present example embodiment may employ import and export support provided with standard SCA 1.1 to resolve subprocesses across packaging/deployment boundaries. For the purposes of the present discussion, a deployment boundary may be any interface between different composite systems.

Note that use of the PLIB 116 facilitates calling of subprocesses across BPEL engines, e.g., the BPEL engines 122, 142, such that a parent process and/or associated subprocess executed on one BPEL engine can call a parent process and/or associated subprocess on another BPEL engine.

Figure 4:
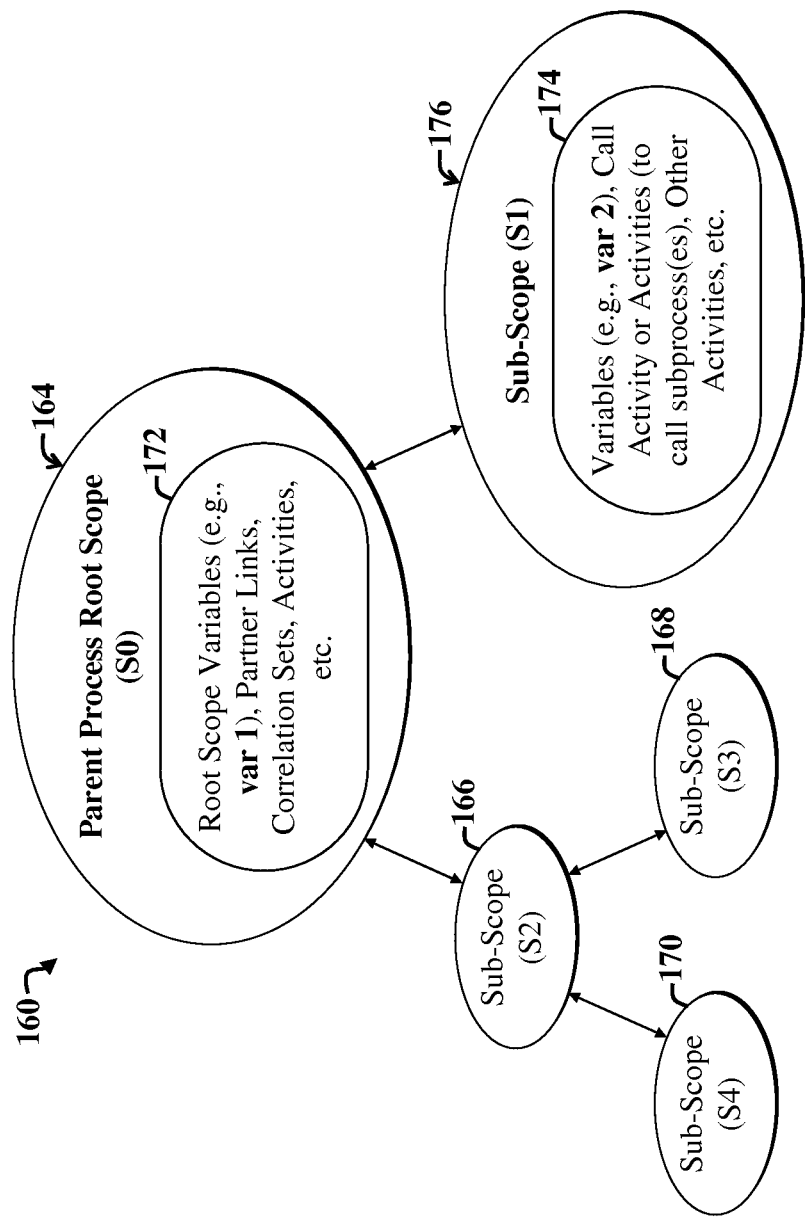
FIG. 4 illustrates a first example process scope tree characterizing the example process of FIG. 1 prior to call activity activation.

FIG. 4 illustrates a first example process scope tree 160, which may characterize a particular process, such as the process 18 of FIG. 1, prior to call activity activation. Note that different processes may have different scope trees, and the scope tree 160 is merely an example of a possible scope tree.

For the purposes of the present discussion, a scope may be a section or grouping of computer code used to affect information flows and behaviors between sections of the computer code. Scopes are often selected to contain or represent a unit of work, such as a particular process activity or other function or task. For example, a scope in a given business process may include computer code for creating a product order. Another scope may include computer code for arranging a shipping service to deliver the product. A given scope may include a primary activity, which itself may include other activities.

Standard BPEL includes a scope element (<scope>) for defining scope activities that demarcate sections assigned to different scopes. Scopes may provide a behavioral context corresponding to a section of computer code included in a scope. The behavioral context may influence execution behavior of one or more activities or software tasks whose computer code is included within a scope activity. The context may include variables, event handlers, fault handlers, compensation handlers, and so on. Scopes may be nested in a hierarchy, such that a given scope may include scopes, called sub-scopes, i.e., child scopes. A scope that includes a child scope is called a parent scope of the child scope.

In general, the root scope of a business process is considered to include the definition of the business process, such that the root scope represents the grouping of computer code that includes all other groupings specified in the definition of the business process. Typically, the context provided by a given scope is shared by any nested scopes and accompanying activities specified therein.

In the present example embodiment, the scope tree 160 includes a parent process root scope 164 (S0), which may include root scope context 172, e.g., root scope level activities and variables (e.g., var 1), including partner links correlation sets.

The parent root scope 164 has a first child scope, i.e., sub-scope 176 (S1), and a second sub-scope 166 (S2). The second sub-scope 166 has two sub-scopes, including a third sub-scope 168, and a fourth sub-scope 170, which are child scopes of the second sub-scope 166, and grandchild scopes of the parent process root scope 164. The first sub-scope 176 and the second sub-scope 166 are sibling scopes.

The second sub-scope 166 is said to enclose the third sub-scope 168 and the fourth sub-scope 170, which are said to be nested within the second sub-scope 166, which is nested within the parent process root scope 164. Similarly, the first sub-scope 176 is nested within the parent process root scope 164, which represents a highest level enclosing scope of the associated parent process. Scopes that enclose other scopes are said to be higher level scopes than the scopes nested therein.

In the present example embodiment, arrows connecting the various scopes are shown as bi-directional to represent both the direction of possible contextual information flow from higher level scopes to accompanying nested scopes and the direction of variable resolution, which may start from a lowest level scope and move up through higher level enclosing scopes, as discussed more fully below.

The first sub-scope 176 includes local context 174, which may include one or more variables (e.g., var 2), activities, and so on. In the present example embodiment, the local context 174 for the first sub-scope 176 includes a call activity used to call a subprocess, such as the subprocess 50 of FIG. 1.

For the purposes of the present discussion, correlation sets may be any mechanism for correlating, i.e., associating or coupling a business process instance with a stateful web service or business process. Correlation sets may provide application-level mechanisms for matching messages between business process instances.

While certain embodiments discussed herein involve use of subprocesses that are adapted to receive variables and partner links via call activity arguments, which are then mapped to subprocess parameters, embodiments are not limited thereto. For example, subprocesses may also be adapted to accept correlation sets via call activity arguments, without departing from the scope of the present teachings.

Furthermore, note that while subprocesses discussed herein are primarily adapted to receive call activity arguments, that subprocesses may be implemented without parameters that are mapped to call activity arguments, without departing from the scope of the present teachings. For example, in certain implementations (such as inline subprocesses previously discussed), a given subprocess may automatically have access to variables and other scope context of higher level scopes that enclose the subprocess, due to scope grafting (i.e., implementation of dynamic scoping rules), which may obviate the need (in some cases) to pass the variables by reference or by value to a subprocess.

Figure 5:
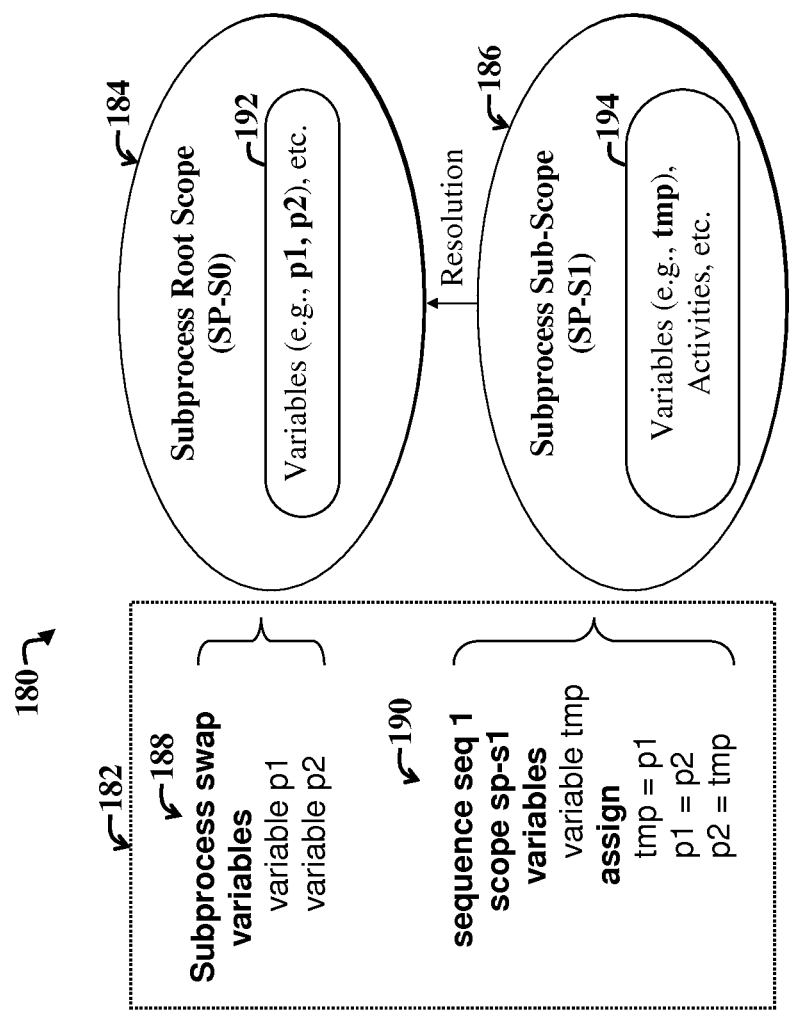
FIG. 5 illustrates a second example process scope tree characterizing a subprocess to be called in a first sub-scope of the example process of FIG. 4.

FIG. 5 illustrates a second example process scope tree 180 characterizing a subprocess to be called in the first sub-scope 176 of the example process scope tree 160 of FIG. 4. The subprocess scope tree 180 includes a subprocess root scope 184 (SP-S0) with subprocess root scope contextual information 192. Example pseudocode 182 illustrates example sections 188, 190 of computer code corresponding to the different subprocess scopes 184, 186.

The example subprocess root scope context 192 includes variables, such as parameters, which may be mapped parent process variables, as discussed more fully below. The parent process variables may be provided via call activity arguments of a call activity statement used to call the subprocess characterized by the subprocess scope tree 180.

Similarly, the subprocess sub-scope 186 includes local context 194, including a so-called temp variable (tmp), and an accompanying assign activity. The local context 192 may access the subprocess root scope context 192. For example, an activity of the subprocess sub-scope context 194 may reference parameters or other items of the root scope context 192.

The example pseudocode 182 represents an example subprocess definition for implementing a variable swap operation. The first pseudocode section 188 sets forth a scope corresponding to the subprocess root scope 184, and declares variables p1 and p2, which are called parameters herein.

For the purposes of the present discussion, a parameter may be any variable or item of a subprocess that can be mapped with a variable or item provided as a call activity argument or that is otherwise in the scope of a parent process scope that includes a call activity for calling the subprocess.

The second pseudocode section 190 sets forth a subprocess sub-scope that includes a so-called temporary variable (tmp) and an assign activity. The temporary variable is used to temporarily hold a value of a parameter to facilitate exchanging value parameters via the assign activity, as illustrated in a second pseudocode section 190.

Figure 6:
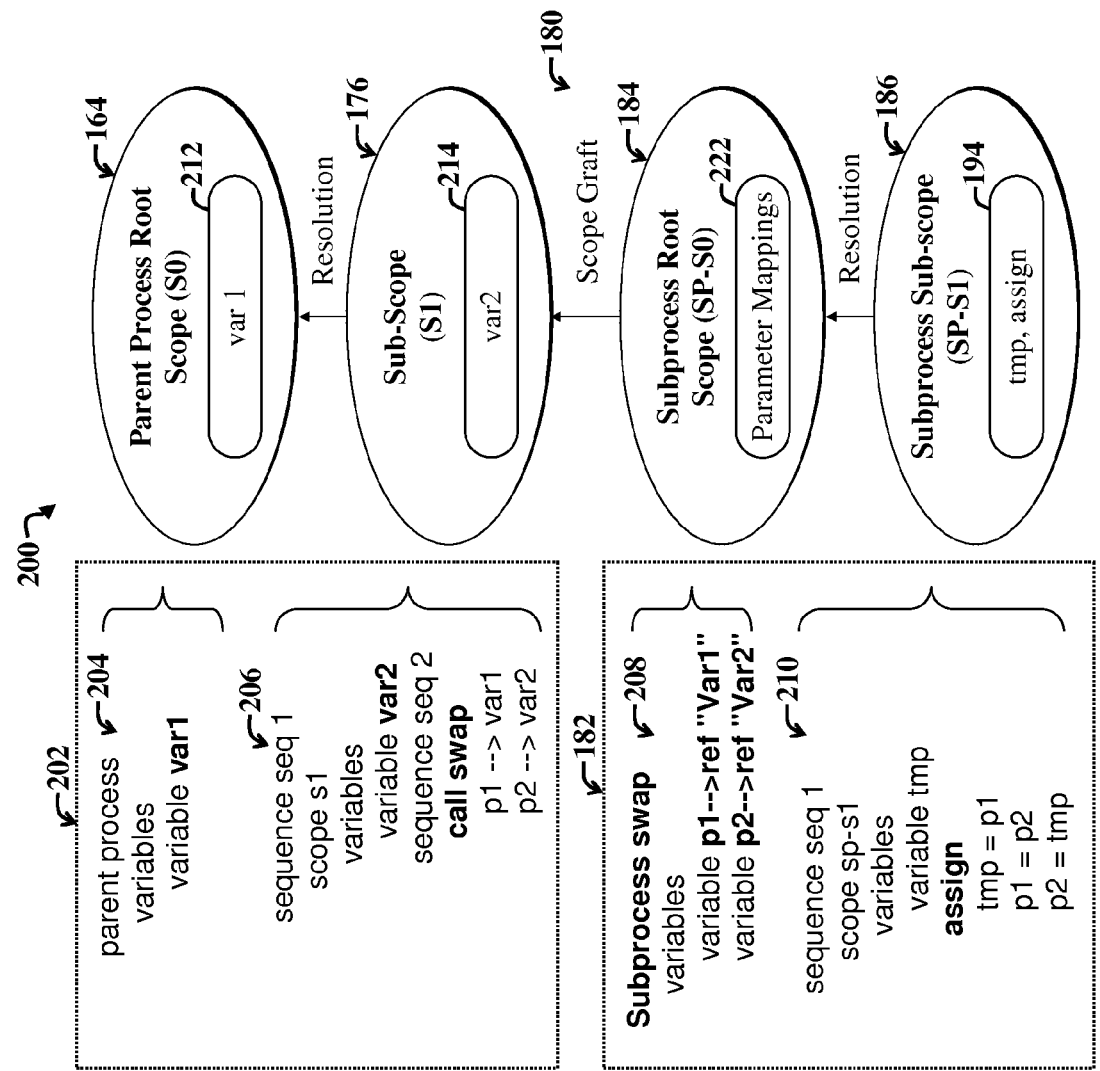
FIG. 6 illustrates a third example process scope tree characterizing a portion of the example scope tree of FIG. 4 after call activity activation, further illustrating subprocess scope grafting (dynamic scoping), variable resolution, and variable-parameter mapping performed by the BPEL engine of FIG. 1.

FIG. 6 illustrates a third example process scope tree 200 characterizing a portion of the example scope tree 160 of FIG. 4 after call activity activation, further illustrating subprocess scope grafting (dynamic scoping), variable resolution, and variable-parameter mapping performed by the BPEL engine of FIG. 1.

In the third example scope tree 200, the subprocess scope tree 180 has been grafted on to the first sub-scope 176 of the scope tree 160 of the parent process 160 in a process called scope grafting, also called dynamic scoping. Scope grafting may be performed by the business process runtime engine 152 of FIG. 1 in accordance with dynamic scoping rules.

A first pseudocode section 202 and a second pseudocode section 182 illustrate example effects of the scope grafting. The first pseudocode section 202 includes a first subsection 204 corresponding to the parent process root scope 164, and a second subsection 206 corresponding to the first sub-scope of the parent process root scope 164. Similarly, the second pseudocode section 182 includes a third subsection 208 corresponding to the subprocess root scope 184, and a fourth subsection 210 corresponding to the subprocess sub-scope 186. The fourth subsection 210 represents computer code, i.e., process logic, defining an example swap operation using the temporary variable (tmp).

For the purposes of the present discussion, dynamic scoping rules may be any rules that specify adjusting a scope to include another scope; to be included within another scope; or to match the scope of another scope. A scope may be any mechanism for grouping information to enable influencing execution behavior of activities specified via code included within a context of the grouped information. An example mechanism includes a BPEL scope activity, which may include constructs for enclosing a group or portion of computer code within the scope. In certain implementations, scopes are nested, such that a parent scope that encloses a child scope does not have access to contextual information (e.g., variables, partner links, correlation sets, message exchanges, handlers, and so on) within the sub-scope, but the sub-scope has access to contextual information included in the parent scope.

With reference to FIGS. 5 and 6, after scope grafting, the context 192 of the subprocess root scope 184 of FIG. 5 is adjusted to include parameter mappings 222. Examples of the parameter mappings 222 are shown in the fourth pseudocode subsection 208 corresponding to the newly grafted subprocess root scope 184.

With reference to FIGS. 4 and 6, a call activity in the first parent process sub-scope 176 was implemented via a call activity statement that included variables (var1 and var2) as arguments to be passed by reference to the subprocess represented by the subprocess scope tree 180 of FIGS. 5 and 6.

The third pseudocode subsection 208 has been adjusted to reflect the effects of adjustments performed by the runtime engine 52 of FIG. 1 during the variable and activity resolution process. In particular, the subprocess parameters (p1 and p2) are adjusted to directly refer to the associated parent process variables (var1 and var 2), which have been passed to the associated subprocess via call activity arguments. Such a mapping represents effects of "passing by reference."

Similarly, the second pseudocode subsection 206 illustrates that a call activity calls the subprocess (named "swap"). Calling of the subprocess facilitates mapping variables (var1 and var2) to respective subprocess parameters (p1 and p2) via call activity arguments (and any attributes included therewith, e.g., an attribute specifying pass by preference mapping).

By virtue of the scope grafting illustrated in FIG. 6, lifecycle management functionality afforded by BPEL used to define the associated parent process is automatically inherited by the subprocess associated with the grafted subprocess scope 180. Accordingly, standard BPEL mechanisms for propagating fault messages between scopes can be used with the subprocess represented by the grafted subprocess scope tree 180.

In general, computer code associated with subprocesses discussed herein is executed in the context in which it is defined. If a fault occurs in a subprocess, and the fault is not caught by any locally defined fault handler, then the subprocess terminates unsuccessfully. A fault is then returned to the parent process.

Similarly, if a fault occurs in a parent process, causing the parent process to terminate, then all subprocesses are automatically cancelled. In addition, if the scope encompassing an already completed subprocess is compensated, then compensation is delegated to the subprocess.

Deployment of a subprocess to a BPEL engine, such as the engine 52 of FIG. 1, may facilitate direct calling of, i.e., activating or invoking of, a subprocess even if the subprocess is defined as a component in a different composite (such as an SBPEL file of a PLIB) than the composite in which the parent process is defined.

In summary, to facilitate coordination of error and compensation handling, a call activity extension is used to set the scope of the call activity as the parent scope of the subprocess root scope. A scope snapshot may be maintained to facilitate compensation. Termination of parent process is propagated to the subprocess and vice versa. A subprocess exit activity informs the associated parent process of any unsuccessful completion, which may result in exiting of the parent process. Any remaining faults not handled in the subprocess are propagated to the parent process after termination of the subprocess scope in accordance with standard fault propagation in a BPEL scope hierarchy.

Operations of the associated BPEL engine (e.g., the BPEL engine 52 of FIG. 1) include variable and activity resolution and execution of the associated parent process and subprocess. With reference to FIGS. 4-6, FIG. 6 represents a branch of the parent process scope tree 160 of FIG. 4 after the call activity (that calls the swap subprocess characterized by the scope tree of FIG. 5) of the first sub-scope 176 is activated.

After subsequent scope grafting, the subprocess 180 shown in FIG. 6 becomes activated, and it executes in accordance with BPEL semantics defining the subprocess logic corresponding to the fourth pseudocode subsection 210. Note that subprocess logic may include standard BPEL semantics, such as assign activities and other activities, elements, and so on, which are consistent with the associated runtime engine.

During variable resolution (involving resolution of variable references), the associated BPEL engine may first determine, for example, that parameter p1 is copied to the temporary variable (tmp) in the local subprocess sub-scope 186, but refers to first variable (var1). Subsequently, the BPEL engine then analyzes the current scope, e.g., the subprocess sub-scope 186, searching for a variable declaration for the first variable var 1. Since var1 is not found in the subprocess sub-scope 186, the BPEL engine analyzes the next higher scope level, i.e., the subprocess root scope 184, where the variable declaration for var1 is not found. Accordingly, the BPEL engine analyzes the next higher level scope 176 until the variable declaration is finally found in the parent process root scope 164.

If the first variable var 1 were instead passed by value to the subprocess characterized by the subprocess scope 180, then the first parameter p1 will represent a copy of the first variable var1. In such a case, the call activity would have an attribute specifying passing by value for variables included as call activity arguments, resulting in copying the first variable var1 and assigning the copy to the first parameter p1 of the called subprocess.

Note that a subprocess in one composite may be used by a subprocess in another composite. This is enabled, in part, by delaying resolution of subprocess references until the time at which the top-level process, i.e., parent process, is created or instantiated. Instantiation of the parent process by the BPEL engine (e.g., the BPEL engine 52 of FIG. 1) may be triggered by an initial message, such as a receive message or other initiation message, addressed to the parent process.

When the initiation message is received, the BPEL engine (runtime engine) begins processing, including resolving variable references, activities, and performing version resolution. For the purposes of the present discussion, a subprocess's version is said to be resolved if its version is determined and matched with a particular call activity of a parent process.

Figure 7:
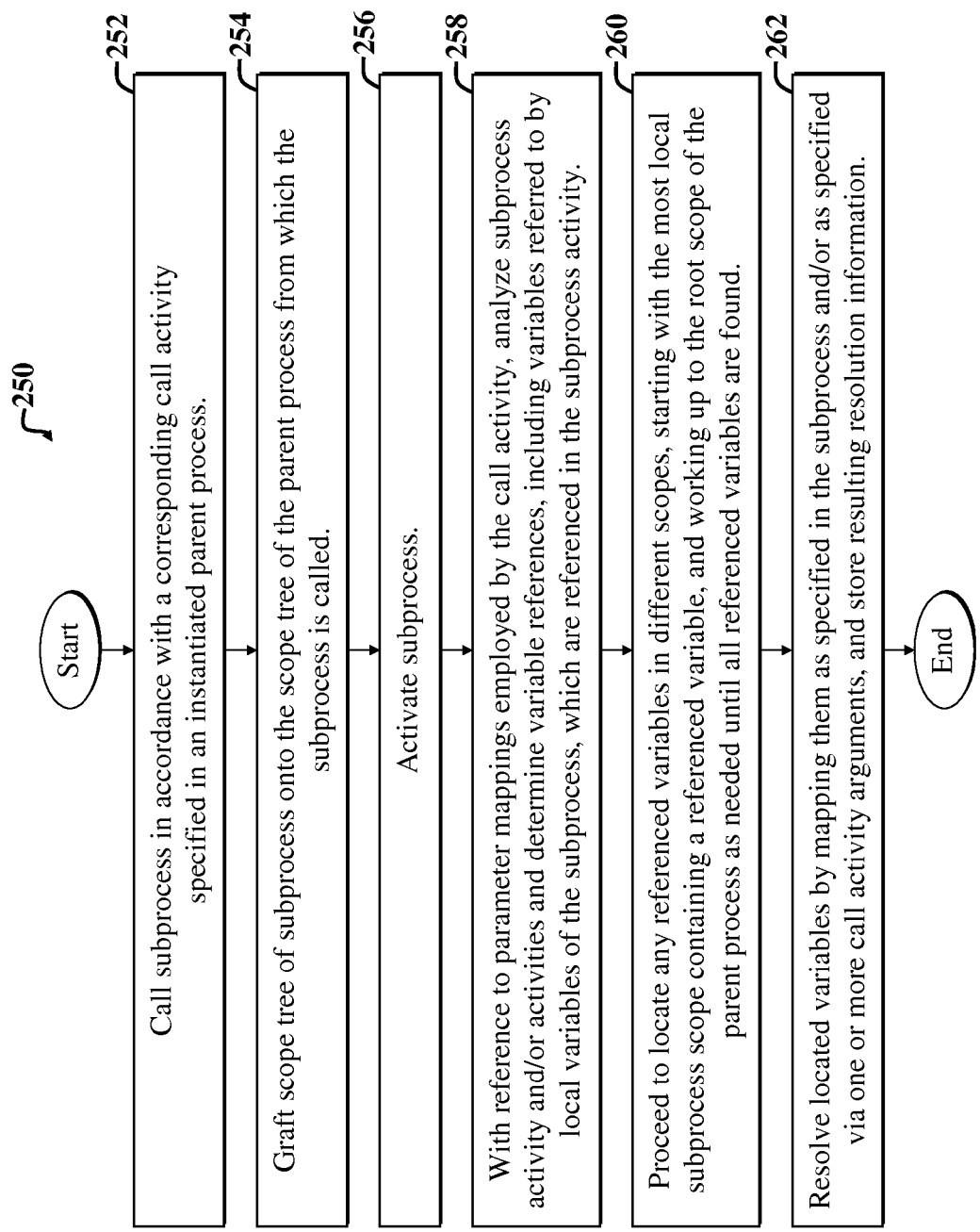
FIG. 7 is a flow diagram of an example method for performing variable resolution, also called artifact resolution, during execution of the parent process and called subprocess of FIG. 1.

FIG. 7 is a flow diagram of a first example method 250 for performing variable resolution, also called artifact resolution, during execution of a parent process (e.g., the parent process 18) and a called subprocess (e.g., the subprocess 50 of FIG. 1). The method 250 includes a first step 252, which involves calling a subprocess in accordance with a corresponding call activity specified in an instantiated parent process.

A second step 254 includes grafting a scope tree of the subprocess onto the scope of the parent process from which the subprocess is called. The subprocess is then activated in a third step 256.

A fourth step 258 includes, referring to parameter mappings (e.g., parameters mapped to variables passed by reference) employed by the call activity to facilitate processing subprocess logic and associated activities to determine references to variables (including any references to partner links, correlation sets, etc.), including variables referred to by local variables of the subprocess, which are made in the subprocess activity.

A fifth step 260 includes proceeding to locate any referred to variables in different scopes, starting with the most local subprocess scope containing a referenced variable, and working up to the parent scope of the parent process as needed until all referred to variables are found.

A sixth step 262 includes resolving located variables by mapping them as specified in the subprocess and/or as specified via call activity arguments.

Figure 8:
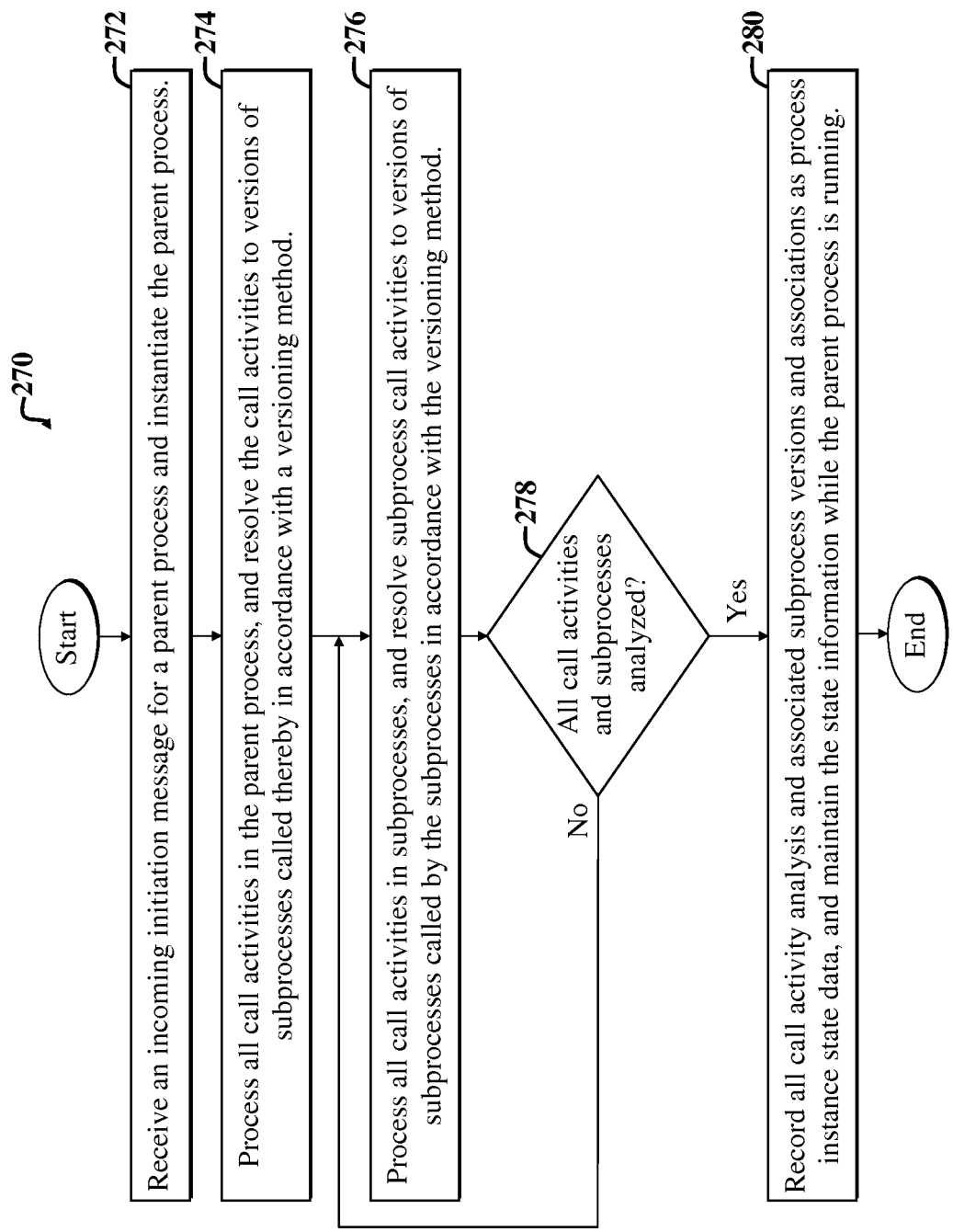
FIG. 8 is a flow diagram of an example method for performing subprocess resolution and versioning during creation of an instance of the parent process and called subprocesses of FIG. 1.

FIG. 8 is a flow diagram of a second example method 270 for performing subprocess resolution and versioning during creation of an instance of a parent process (e.g., the parent process and called subprocesses of FIG. 1). The example method 270 includes an initial receiving step 272, which involves receiving an incoming initiation message for a parent process and instantiate the parent process.

A subsequent first processing step 274 includes processing all call activities in the parent process, and resolving the call activities to versions of subprocesses called thereby in accordance with a versioning method.

A second processing step 276 includes processing all call activities in subprocesses, and resolving subprocess call activities to versions of subprocesses called by the subprocesses in accordance with the versioning method.

A subsequent analysis checking step 278 determines if all call activities and subprocesses have been processed, i.e., analyzed. If not, then control is passed back to the second processing step 276. Otherwise, control is passed to a recording step 280.

The recording step 280 includes recording all call activity analysis and associated subprocess versions and associations as process instance state data, and maintaining the state information while the parent process is running.

The second example method 270 may be augmented or otherwise varied, without departing from the scope of the present teachings. For example, the first processing step 274 may further include employing a business process runtime engine to first analyze the composite containing the parent process to find call activities and associated version information before analyzing any other composites accessible to the business process runtime engine.

The second processing step 274 may further include analyzing any optional call activity attributes used to identify call activity version information. Alternatively or in addition, call activities and subprocess activities lacking version attributes or strings may be set to default versions. A default version of a call activity or subprocess activity may be set, for example, to be equivalent to the version of the composite in which the call activity or subprocess is defined via an associated call activity element or subprocess element, respectively. Alternatively, default versions of such activities are set to share version information associated with a particular namespace if the version of the namespace that specifies a call activity element is different than the version of an associated composite that references the namespace.

A composite management system, functionality of which may be included in a business process runtime engine, may alternatively set the version of a call activity and/or subprocess to be the most actively used activity or the most recently used activity, depending upon the needs of a particular implementation. Methods for setting version information for activity functionality, and/or specific instances of activities, such as subprocess activities may be implementation specific and may vary, without departing from the scope of the present teachings. For example, certain implementations may require support for legacy applications, i.e., for backward compatibility. However, in general, versioning methods are consistent with the behaviors and capabilities of associated business process runtime engines used to implement instances of various activities.

By allowing packaging of related components into composites, versioning methods may be greatly simplified by simply making versions of different activity elements match with versions of the components that use the activity elements.

Recall that subprocesses of a given composite may be employed by one or more subprocess or processes of another composite. Furthermore, a first subprocess may call a second subprocess that in turn calls the first subprocess, such that the first subprocess indirectly calls itself. In addition, a given standalone subprocess or inline subprocess may call itself.

Such capabilities inherent in subprocesses discussed herein enable subprocess nesting and recursive loops, which may facilitate use of recursion. For the purposes of the present discussion, recursion may be any method characterizing a calculation or function that involves using the calculation or function itself to perform the calculation.

Recursion may represent powerful functionality for performing different types of process logic and associated calculations. For example, a subprocess that calculates a value in the Fibonacci sequence may be configured to call itself to facilitate the calculation.

Note however, that implementations of embodiments discussed herein are not limited to implementations that enable all subprocesses to call themselves either directly or indirectly. For example, in certain implementations, inline subprocesses are restricted from calling themselves, i.e., nested scopes for inline subprocesses are restricted, whereas the standalone subprocesses are allowed to directly or indirectly call themselves.

However, in the present example embodiment, both inline and standalone subprocesses may be nested. However, in general, inline subprocesses can only call standalone subprocesses whose associated call activities and accompanying scopes are visible from the inline subprocess. The visibility of an inline subprocess or standalone subprocess includes its own scope and any higher level enclosing scopes (including a parent process root scope), determined after scope grafting of the subprocess to the scope of the associated calling activity.

Note that various embodiments discussed herein may enable sharing of a given subprocess model simultaneously among plural different parent processes, and each of the different parent processes may simultaneously call a subprocess with different variables than those used by another calling activity of another process. This is in part enabled by use of scope grafting as discussed herein.

The second example method 270 may further include various additional steps, (e.g., which may be performed by a business process runtime engine) such as: analyzing a composite that includes one or more parent processes and determining one or more call activities referencing one or more subprocesses in the one or more parent processes in response thereto; determining version information pertaining to the one or more subprocesses; resolving each of the one or more subprocesses in accordance with the version information; analyzing each of the one or more subprocesses for one or more references to one or more other subprocesses; determining version information pertaining to the one or more other subprocesses; resolving each of the one or more other subprocess in accordance with version information of each of the one or more other subprocesses; and storing state information characterizing each of the one or more subprocesses and each of the one or more other subprocesses.

Figure 9:
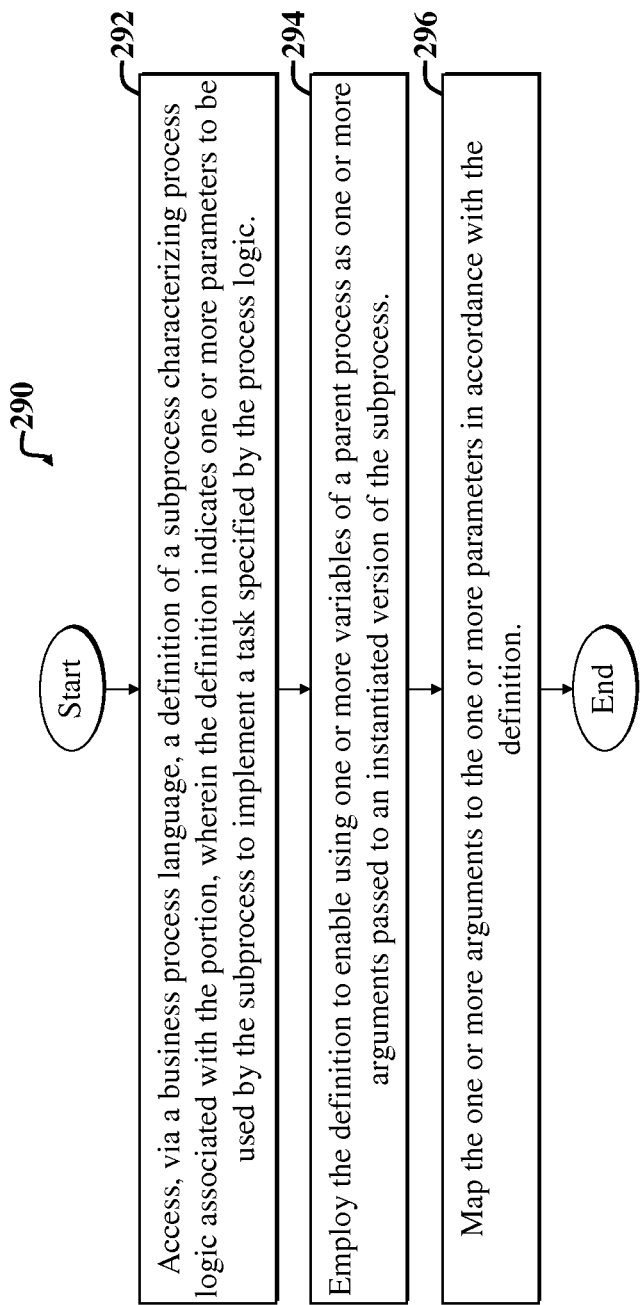
FIG. 9 is a flow diagram of an example method for employing a subprocess definition to map in-scope (of the call activity) variables of a parent process to parameters of a subprocess.

FIG. 9 is a flow diagram of a third example method 290 for employing a subprocess definition to map in-scope (of the call activity) variables of a parent process to parameters of a subprocess. The example method 290 includes a first accessing step 292, which involves accessing, via a business process language, a definition of a subprocess characterizing process logic associated with the portion, wherein the definition indicates one or more parameters to be used by the subprocess to implement a task specified by the process logic.

An employing step 294 includes employing the definition to enable: using one or more variables of a parent process as one or more arguments passed to an instantiated version of the subprocess.

A subsequent mapping step 296 includes mapping the one or more arguments to the one or more parameters in accordance with the definition.

Examples of additional steps that may optionally be incorporated into the method 290 include: characterizing a behavior of the subprocess via one or more dynamic scoping rules; employing a BPEL extension activity to facilitate accessing the definition of the subprocess; and assigning the one or more parameters to the one or more variables indicated by the one or more arguments, thereby implementing passing by reference the one or more variables from the parent process to the subprocess.

The third example method 290 may further include assigning one or more parameters to one or more copies of the one or more variables indicated by the one or more arguments, thereby implementing passing by value of the one or more variables from the parent process to the subprocess.

Additional example steps include: accessing a definition of a call activity to enable calling the subprocess from the parent process, wherein a reference to the call activity includes the one or more arguments set with the one or more variables; and accessing one or more attributes provided in a reference to a call activity to characterize one or more parameters received as the one or more variables via the one or more arguments.

The one or more attributes may include a from-spec initializer that is adapted to initialize one or more of the one or more parameters. The from-spec initializer may represent an optional attribute for optionally setting a default value for a parameter of the subprocess.

An additional example step includes determining if a parameter initialized by a from-spec initializer represents a parameter mapped to a variable supplied in the reference to the call activity and selectively overwriting an initialized value of the parameter with a value specified via the variable in response thereto.

The reference to the call activity may further include one or more attributes characterizing whether the mapping is to implement passing by reference or passing by value of the one or more arguments to the one or more parameters.

The third example method 290 may further include: employing the subprocess to access one or more variables of the parent process that are not passed via one or more arguments to the subprocess, but are in a scope characterizing the reference to the call activity in the parent process, i.e., are visible from the scope of the call activity in the parent process.

The third example method 290 may further include employing an instantiated version of the call activity to pass plural variables to the subprocess via the plural arguments indicated in a portion of computer code referencing the call activity and in accordance with the attribute.

In addition, the third example method 290 may include employing the code fragment representing the process logic and included in the subprocess definition to perform an operation (e.g., swap) on the one or more variables or on copies of the one or more variables, via the one or more parameters, when the one or more variables are passed by reference or by value, respectively, to the subprocess from the parent process.

Note that when a partner link is passed to a particular subprocess, the partner link will be a partner link of the parent process with another process, such as a web service, where the partner link is in the scope of the parent process scope containing the associated call activity statement used to call the subprocess. In general, partner links passed to a subprocess do not characterize the interface between the parent process and the subprocess, which need not be a web service interface.

Another example step that may augment the method 290 includes employing a subprocess definition and associated call activities to enable a portion of a subprocess (e.g., represented via a call activity statement) to call the subprocess containing the portion, thereby further facilitating enabling recursion and associated recursive calculations.

Figure 10:
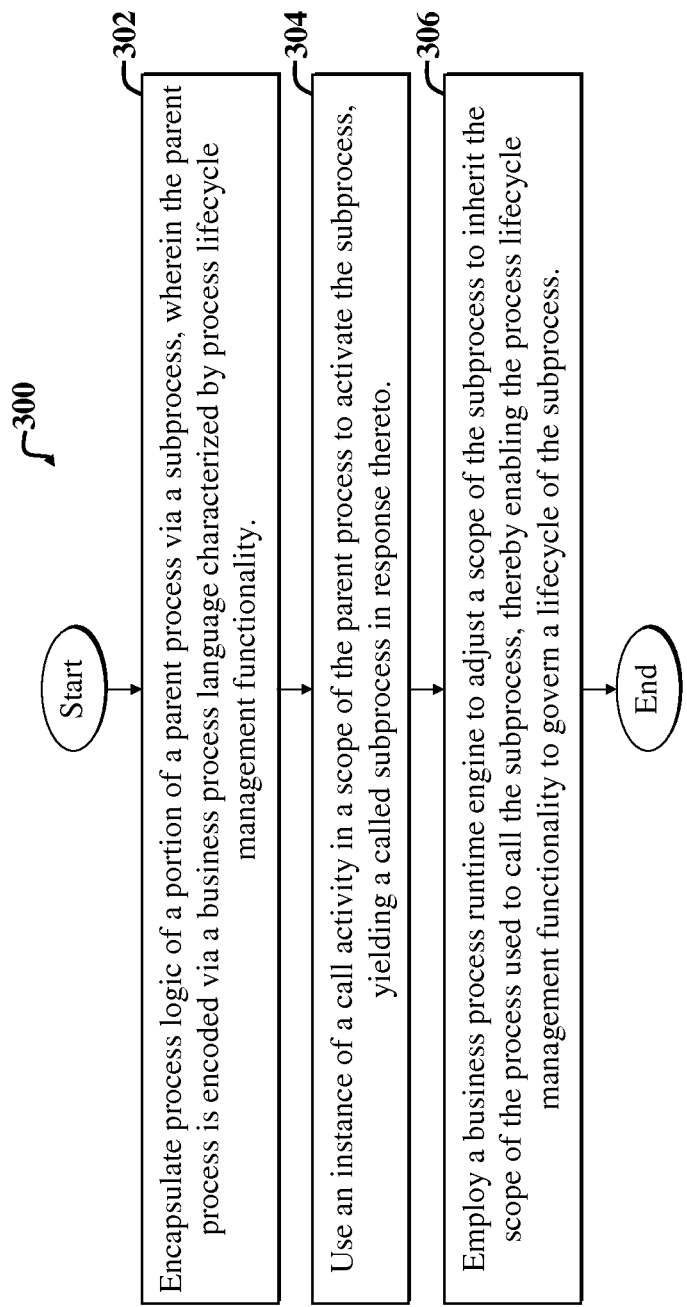
FIG. 10 is a flow diagram of an example method for employing a call activity and runtime adjustment of a scope of a subprocess to facilitate executing a subprocess.

FIG. 10 is a flow diagram of a fourth example method 300 for employing a call activity and runtime adjustment of a scope of a subprocess to facilitate executing a subprocess. The example method 300 includes an encapsulation step 302, which includes encapsulating process logic of a portion of a parent process via a subprocess, wherein the parent process is encoded via a business process language characterized by process lifecycle management functionality.

A subsequent calling step 304 includes using an instance of a call activity in a scope of the parent process to activate the subprocess, yielding a called subprocess in response thereto.

Next, an employing step 306 includes employing a business process runtime engine to adjust a scope of the subprocess to inherit the scope of the process used to call the subprocess, thereby enabling the process lifecycle management functionality to govern a lifecycle of the subprocess.

The fourth example method 300 may be modified and/or augmented with additional detail, without departing from the scope of the present teachings. For example, the method 300 may further include employing the parent process to communicate with a standalone subprocess via a WS-addressing interface.

The call activity may represent an asynchronous request from the parent process to the subprocess, wherein the interface between the parent process and the subprocess lacks a (WSDL) interface therebetween.

The fourth example method 300 may further include passing data from the parent process to the subprocess via one or more arguments of the call activity. The subprocess may be an inline subprocess defined in the parent process. A relative Uniform Resource Identifier (URI) may be used to reference the inline subprocess within computer code of the parent process, whereas an absolute URI may be used to reference a standalone subprocess.

For the purposes of the present discussion, a URI may be any information identifying a computing resource. The information may include, for example, a specification, such as an address (e.g., a Uniform Resource Locator (URL)), of an actual location or relative location and/or name of a computing resource, such as a process, web page, or other file.

An absolute URI, also called an actual reference herein, may be information specifying, such as via URL information, a location of actual component, such as a standalone subprocess, from which a subprocess comes. The actual reference may include a specification of a location identifying a physical address of a service (or service component).

A relative URI, also called a relative reference herein, may be any specification of a component, such as an inline subprocess, that is relative to another location, e.g., the location of the associated process definition, e.g., process template.

The fourth example method 300 may further specify that the call activity includes plural arguments, wherein each of the plural arguments is associated with a variable that is within the scope of the parent process in which the call activity is defined.

The variable contains data to be passed to the subprocess from the parent process. The variable may include a partner link present within the grafted scope of the subprocess.

The fourth example method 300 may further include: making a root scope of the subprocess a child of the scope of the parent process that contains the call activity; employing a runtime management system to perform the making after an instance of the parent process is created; enabling, by virtue of the scope of the subprocess, access by the subprocess to one or more variables of the parent process that have not been passed via arguments of a call activity to the subprocess; employing the subprocess to map plural variables of the parent process to plural corresponding parameters of the subprocess via the arguments; and generating a fault message if a variable referred to in a subprocess is not included in a scope of the parent process that contains the call activity.

Figure 11:
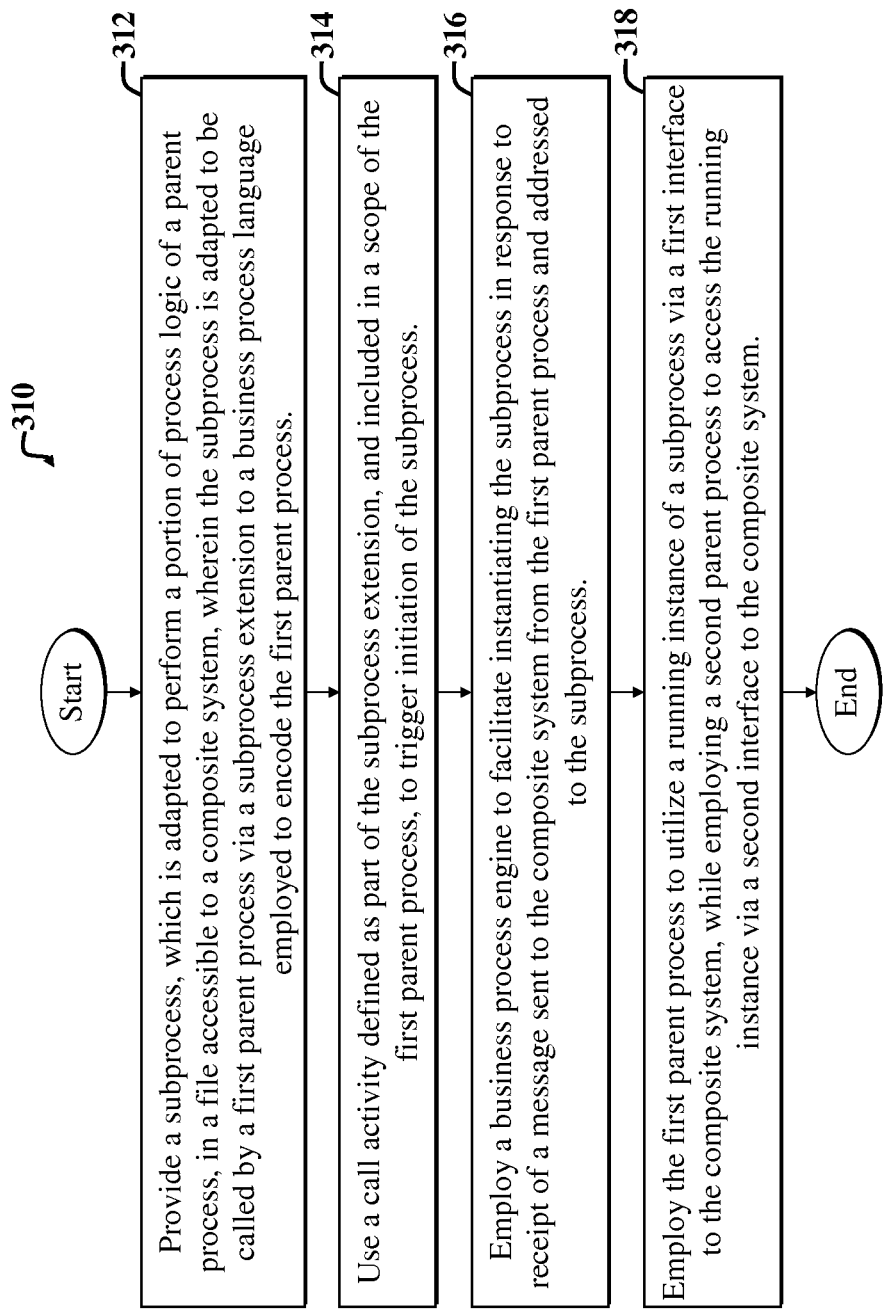
FIG. 11 is a flow diagram of an example method for employing a composite system to facilitate sharing of a subprocess between parent processes.

FIG. 11 is a flow diagram of a fifth example method 310 for employing a composite system to facilitate sharing of a subprocess between parent processes. The example method 310 includes an initial providing step 312, which includes providing a subprocess that is adapted to perform the process logic in a file accessible to a composite system, wherein the subprocess is adapted to be called by a first parent process via a subprocess extension to a business process language employed to encode the first parent process.

A subsequent triggering step 314 includes using a call activity defined as part of the subprocess extension, and included in a scope of the first parent process, to trigger initiation of the subprocess.

Next, an initiating step 316 includes employing a business process engine to facilitate instantiating the subprocess in response to receipt of a message sent to the composite system from the first parent process and addressed to the subprocess.

Subsequently, an employing step 318 includes employing the first parent process to utilize a running instance of a subprocess via a first interface to the composite system, and employing a second parent process to access the running instance via a second interface to the composite system.

The fifth example method 310 may be modified to include different steps and/or additional or less detail, without departing from the scope of the present teachings. For example, the method 310 may specify that the subprocess is defined in a namespace that is maintained via the composite system and referenced by a business process file that contains computer code for the second parent process.

The fifth example method 310 may further include, with reference to FIG. 3, employing the first parent process to utilize a running instance of a subprocess via a first interface to the composite system, and employing a second parent process to access the running instance via a second interface to the composite system.

The subprocess may be defined in a namespace maintained via the composite system and referenced by a business process file that contains computer code for the second parent process. The business process file may include an SBPEL file deployed in accordance with an SCA implementation, e.g., standard SCA 1.1. The SBPEL file may be included in or referenced by a PLIB.

The fifth example method 310 may further include determining a revision version of a subprocess to be the same as a revision version of a composite file in which the subprocess is referenced or included, and using SCA functionality to resolve a subprocess across a deployment boundary.

The fifth example method 310 may further include employing the business process engine to configure one or more partner links defined in a subprocess on a component that includes a definition of the subprocess, thereby facilitating enabling reuse of the subprocess with the configuration, and further facilitating enabling creation of one or more reusable components for a given subprocess.

The subprocess definition may be included in a composite is enumerated in a composite configuration file (e.g., composite.xml) that includes one or more service components, references, and binding properties. A business process engine may delay resolving subprocess references in parent business process files until an instance of a parent process is created.

The fifth example method 310 may further include: detecting receipt of an initiation message for a parent process and instantiating the parent process in response thereto; and analyzing all references to a subprocess included in computer code defining a parent process, remembering the references, and resolving the references, including analysis information identifying where a references is included, what subprocess the reference refers to, the version of the subprocess, state information pertaining to each subprocess, and what processes and subprocesses are referred to by each subprocess, in response to the analysis.

The fifth example method 310 may further include further including detecting when a previously instantiated version of a subprocess has been dehydrated, and then selectively activating a dehydrated subprocess in response to receipt of a message by a runtime composite management system referencing the dehydrated subprocess.

Use of computing resources by a process and accompanying subprocesses may be reduced by selectively using dehydration. A process (i.e., process instance) is said to be dehydrated if it is unloaded from memory (e.g., of a business process runtime engine), such as when it is not actively being used, and into a data store, called a dehydration store. The process may be reloaded when needed, such as in response to a message addressed to process.

The example method 310 may further include employing a runtime composite management system to perform the following steps: analyzing a composite that includes one or more parent processes and determining one or more call activities referencing one or more subprocesses in the one or more parent processes in response thereto; determining version information pertaining to the one or more subprocesses; resolving each of the one or more subprocesses in accordance with the version information; analyzing each of the one or more subprocesses for one or more references to one or more other subprocesses; determining version information pertaining to the one or more other subprocesses; resolving each of the one or more other subprocess in accordance with version information of each of the one or more other subprocesses; and storing state information characterizing each of the one or more subprocesses and each of the one or more other subprocesses.

Note that those skilled in the art with access to the present teachings may readily develop additional functionality to meet the needs of a given implementation without undue experimentation. Various additional implementations and example use cases are possible, such as use of inline subprocesses exhibiting nested scopes; incorporation of "effective date" mechanisms for distinguishing subprocess versions from those of associated composites; use of subprocesses in particular recursive applications; methods for converting one or more BPEL process sequence activities or flow activities into a subprocesses; mechanisms for warning users or administrators of an undeployment request that is for a component that is referenced by active or dehydrated business process instance; mechanisms for using standalone subprocesses to define global constants and variables; mechanisms for supporting use of correlation sets as call activity arguments, and so on.

Although the description has been described with respect to particular embodiments thereof, these particular embodiments are merely illustrative, and not restrictive. For example, although various embodiments are discussed herein as employing extensions to standard BPEL, embodiments are not limited thereto. For example various embodiments discussed herein can be adapted to any block structured flow-based business process language.

Any suitable programming language can be used to implement the routines of particular embodiments including C, C++, JAVA programming language, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for defining, reusing and visualizing subprocesses using Business Process Modeling Language (BPEL) activities and elements executed by one or more processors, where subprocesses are called by a parent process, where a subprocess is an encapsulated and reusable portion of process logic adapted to be called by another process, the method comprising:

executing, by the parent process and by the one or more processors, a call activity identifying a subprocess to be called, with the call activity having one or more arguments employing a plurality of parameter mappings, with the parent process having a parent process root scope and a subscope including a context for executing the call activity, and with the call activity setting the subscope as a parent scope of a root scope of the subprocess, where a scope is a demarcated section or grouping of computer code and where the functionality, behavior, and semantics of the call activity are defined via a BPEL extension activity specified in a subprocess XML (Extended Markup Language) namespace incorporated in computer code of the parent process;

activating, by the one or more processors, the subprocess, where an activated instance of a subprocess refers to an instance of a call activity within an instance of the parent process that calls the subprocess;

analyzing, by the subprocess and one or more processors and with reference to parameter mapping employed by the call activity, at least one subprocess activity;

determining, by the subprocess and one or more processors, variable references which are referenced in the at least one subprocess activity;

locating, by the subprocess and one or more processors, any referenced variables in different scopes, starting with a most local subprocess scope containing a referenced variable and working up to the root scope of the parent process as needed until all referenced variable are found; and resolving, by the subprocess and one or more processors, located variables by mapping the located variables as specified by the subprocess or the by the one or more call activity arguments.

2. The method of claim 1, further including characterizing a behavior of the subprocess via one or more dynamic scoping rules.

3. The method of claim 1, wherein the parent process includes a business process, and further including employing a BPEL extension activity to facilitate accessing the definition of the subprocess.

4. The method of claim 3, wherein mapping further includes assigning one or more parameters to one or more variables indicated by the one or more arguments, thereby implementing passing by reference the one or more variables from the parent process to the subprocess.

5. The method of claim 3, wherein mapping further includes assigning one or more parameters to one or more copies of the one or more variables indicated by the one or more arguments, thereby implementing passing by value of the one or more variables from the parent process to the subprocess.

6. The method of claim 3, further including accessing a definition of a call activity to enable calling the subprocess from the parent process, wherein a reference to the call activity includes the one or more arguments set with the one or more variables.

7. The method of claim 6, further including accessing one or more attributes provided via a reference to a call activity to characterize one or more parameters received as the one or more variables via the one or more arguments.

8. The method of claim 7, wherein the one or more attributes include a from-spec initializer adapted to initialize one or more of the one or more parameters, and wherein the from-spec initializer represents an optional attribute for optionally setting a default value for a parameter of the subprocess.

9. The method of claim 7, further including determining if a parameter initialized by a from-spec initializer represents a parameter mapped to a variable supplied in the reference to the call activity and selectively overwriting an initialized value of the parameter with a value specified via the variable in response thereto.

10. The method of claim 6, wherein the reference to the call activity further includes one or more attributes characterizing whether the mapping is to implement passing by reference or passing by value of the one or more variables to the subprocess in preparation for mapping the one or more variables to the one or more parameters.

11. The method of claim 10, further including employing the subprocess to access one or more variables of the parent process that are not passed via one or more arguments to the subprocess, but are in a scope characterizing the reference to the call activity in the parent process.

12. The method of claim 10, further including employing an instantiated version of the call activity to pass plural variables to the subprocess via the plural arguments indicated in a portion of computer code referencing the call activity and in accordance with the one or more attributes.

13. The method of claim 6, further including detecting when the call activity lacks specification of an attribute indicating whether the mapping is to implement passing by value or passing by reference, and employing passing by reference as a default when the call activity lacks the specification.

14. The method of claim 6, further including employing the code fragment representing the process logic and included in the subprocess definition to perform an operation on the one or more variables or on copies of the one or more variables, via the one or more parameters, when the one or more variables are passed by reference or by value, respectively, to the subprocess from the parent process.

15. The method of claim 6, wherein the one or more variables further include one or more partner links, and wherein an interface between the parent process and the subprocess does not employ a BPEL receive activity and does not employ a BPEL reply activity.

16. The method of claim 3, wherein the definition of the subprocess is adapted to enable a portion of the subprocess to call the subprocess itself, thereby facilitating recursion.

17. The method of claim 1, wherein definition of the subprocess includes a definition of a standalone subprocess, and wherein the definition of the standalone subprocess is adapted to enable an instance of a subprocess to be shared simultaneously among plural parent processes.

18. The method of claim 1, wherein the definition of the subprocess includes a definition of an inline subprocess, wherein the definition of the inline subprocess is included in computer code characterizing the parent process, and wherein the definition of the inline subprocess is characterized by a child scope of a parent process that calls the subprocess via a call activity statement included in computer code thereof.

19. An apparatus comprising:
a digital processor coupled to a display and to a processor-readable storage device, wherein the processor-readable storage device includes one or more instructions implementing, reusing and visualizing subprocesses using Business Process Modeling Language (BPEL) activities and elements executed by one or more processors, where subprocesses are called by a parent process, where a subprocess is an encapsulated and reusable portion of process logic adapted to be called by another process, with the one or more instructions executable by the digital processor to perform the following acts:

executing, by the parent process, a call activity identifying a subprocess to be called, with the call activity having one or more arguments employing a plurality of parameter mappings, with the parent process having a parent process root scope and a subscope including a context for executing the call activity, and with the call activity setting the subscope as a parent scope of a root scope of the subprocess, where a scope is a demarcated section or grouping of computer code and where the functionality, behavior, and semantics of the call activity are defined via a BPEL extension activity specified in a subprocess XML (Extended Markup Language) namespace incorporated in computer code of the parent process;

activating the subprocess, where an activated instance of a subprocess refers to an instance of a call activity within an instance of the parent process that calls the subprocess;

analyzing, by the subprocess and with reference to parameter mapping employed by the call activity, at least one subprocess activity;

determining, by the subprocess, variable references which are referenced in the at least one subprocess activity;

locating, by the subprocess, any referenced variables in different scopes, starting with a most local subprocess scope containing a referenced variable and working up to the root scope of the parent process as needed until all referenced variable are found; and resolving, by the subprocess, located variables by mapping the located variables as specified by the subprocess or the by the one or more call activity arguments.

20. A non-transitory processor-readable storage device including instructions executable by a digital processor defining, reusing and visualizing subprocesses using Business Process Modeling Language (BPEL) activities and elements executed by one or more processors, where subprocesses are called by a parent process, where a subprocess is an encapsulated and reusable portion of process logic adapted to be called by another process, the non-transitory processor-readable storage device including one or more instructions for:

executing, by the parent process, a call activity identifying a subprocess to be called, with the call activity having one or more arguments employing a plurality of parameter mappings, with the parent process having a parent process root scope and a subscope including a context for executing the call activity, and with the call activity setting the subscope as a parent scope of a root scope of the subprocess, where a scope is a demarcated section or grouping of computer code and where the functionality, behavior, and semantics of the call activity are defined via a BPEL extension activity specified in a subprocess XML (Extended Markup Language) namespace incorporated in computer code of the parent process;

activating the subprocess, where an activated instance of a subprocess refers to an instance of a call activity within an instance of the parent process that calls the subprocess;

analyzing, by the subprocess and with reference to parameter mapping employed by the call activity, at least one subprocess activity;

determining, by the subprocess, variable references which are referenced in the at least one subprocess activity;

locating, by the subprocess, any referenced variables in different scopes, starting with a most local subprocess scope containing a referenced variable and working up to the root scope of the parent process as needed until all referenced variable are found; and resolving, by the subprocess, located variables by mapping the located variables as specified by the subprocess or the by the one or more call activity arguments accessing, via a business process language, a definition of a subprocess characterizing process logic associated with the portion, wherein the definition indicates one or more parameters to be used by the subprocess to implement a task specified by the process logic; and employing the definition to enable:
  using one or more variables of a parent process as one or more arguments passed to an instantiated version of the subprocess; and
  mapping the one or more arguments to the one or more parameters in accordance with the definition.

* * * * *

UNITED STATES PATENT AND TRADEMARK OFFICE
CERTIFICATE OF CORRECTION

PATENT NO.        : 9,141,383 B2                                                Page 1 of 1
APPLICATION NO.   : 13/963708
DATED             : September 22, 2015
INVENTOR(S)       : Kumar et al.

It is certified that error appears in the above-identified patent and that said Letters Patent is hereby corrected as shown below:

In the specification

Column 22, line 40, delete "/wsbpe/" and insert -- /wsbpel/ --, therefor.

Column 23, line 39, delete "|"no]"? />+" and insert -- |"no"]? />+ --, therefor.

Signed and Sealed this
Thirty-first Day of May, 2016

Michelle K. Lee
*Director of the United States Patent and Trademark Office*